(12) United States Patent
Maki et al.

(10) Patent No.: US 7,475,294 B2
(45) Date of Patent: Jan. 6, 2009

(54) COMPUTER SYSTEM INCLUDING NOVEL FAULT NOTIFICATION RELAY

(75) Inventors: Nobuhiro Maki, Yokohama (JP); Yuri Hiraiwa, Sagamihara (JP); Kenichi Oyamada, Yokohama (JP); Hideaki Abe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 459 days.

(21) Appl. No.: 11/132,177

(22) Filed: May 19, 2005

(65) Prior Publication Data

US 2006/0107098 A1     May 18, 2006

(30) Foreign Application Priority Data

Oct. 29, 2004    (JP)   ............... 2004-315849

(51) Int. Cl.
    *G06F 11/00*      (2006.01)
(52) U.S. Cl. ........................................ 714/48; 711/162
(58) Field of Classification Search .................... 714/48
    See application file for complete search history.

(56) References Cited

U.S. PATENT DOCUMENTS

| | | | |
|---|---|---|---|
| 5,091,847 A * | 2/1992 | Herbermann | .................. 714/3 |
| 6,209,002 B1 * | 3/2001 | Gagne et al. | ................. 707/204 |
| 6,237,008 B1 * | 5/2001 | Beal et al. | .................... 707/204 |
| 6,529,944 B1 * | 3/2003 | LeCrone | ..................... 709/211 |
| 6,950,915 B2 * | 9/2005 | Ohno et al. | ................. 711/162 |
| 2004/0068629 A1 * | 4/2004 | Fujibayashi et al. | ......... 711/162 |

* cited by examiner

*Primary Examiner*—Scott T. Baderman
*Assistant Examiner*—Kamini Patel
(74) *Attorney, Agent, or Firm*—Mattingly, Stanger, Malur & Brundige, P.C.

(57) ABSTRACT

The computer system includes a computer, a first storage system configured to be communicable with the computer, and a second storage system configured to be communicable with the first storage system. The second storage system identifies the first storage system that is capable of communicating with the second storage system, detects fault occurring in the second storage system, and transmits fault information to the identified first storage system, the fault information being related to the detected fault. And the first storage system notifies the computer of the transmitted fault information.

13 Claims, 32 Drawing Sheets

Fig.5A  VOLUME INFORMATION

141P

| VOLUME # | VOLUME STATUS | CAPACITY | PAIR # | HDD # | COPY KIND | GROUP # |
|---|---|---|---|---|---|---|
| 0 | FOR FAULT NOTIFICATION | - | - | - | - | - |
| 1 | COMMAND DEVICE | 1 | - | 1 | - | - |
| 2 | NORMAL | 2 | 1 | 2 | LM | 1 |
| 3 | NORMAL | 2 | 1 | 3 | ASYNCHRONOUS RC | 1 |
| 4 | NORMAL | 3 | 1 | 0 | ASYNCHRONOUS RC | 1 |
| 5 | UNUSED | 3 | 0 | 0 | 0 | 0 |

Fig.5B  PAIR INFORMATION

142P

| COPY KIND | PAIR # | PAIR STATUS | PRIMARY VOLUME | | SECONDARY VOLUME | | GROUP # |
|---|---|---|---|---|---|---|---|
| | | | STORAGE SYSTEM | VOLUME # | STORAGE SYSTEM | VOLUME # | |
| LM | 1 | NORMAL | P | 2 | P | 3 | 1 |
| ASYNCHRONOUS RC | 1 | NORMAL | P | 3 | L | 2 | 1 |
| ASYNCHRONOUS RC | 2 | NORMAL | P | 4 | L | 5 | 1 |
| SYNCHRONOUS RC | 1 | UNUSED | - | - | - | - | - |

Fig.5C  PATH INFORMATION

143P

| PATH # | COPY KIND | GROUP # | PHYSICAL PATH ASSIGNMENT INFORMATION | | | | PATH STATUS |
|---|---|---|---|---|---|---|---|
| | | | PRIMARY | | SECONDARY | | |
| | | | STORAGE SYSTEM | I/O PORT # | STORAGE SYSTEM | I/O PORT # | |
| 1 | ASYNCHRONOUS RC | 1 | P | 1 | L | 1 | NORMAL |
| 2 | ASYNCHRONOUS RC | 1 | P | 1 | L | 1 | USEABLE |
| 3 | - | - | P | 2 | L | 2 | NO PATH |

Fig.7A  FAULT NOTIFICATION TABLE (PRODUCTION SITE)

144P

| NO | FAULT INFORMATION DESTINATION | PAIR DEFINING INFORMATION | | | | |
|---|---|---|---|---|---|---|
| | | COPY KIND | PRIMARY VOLUME | | SECONDARY VOLUME | |
| | | | STORAGE SYSTEM | VOLUME # | STORAGE SYSTEM | VOLUME # |
| 1 | 200P | LM | P | 2 | P | 3 |
| 2 | 200P | ASYNCHRONOUS RC | P | 3 | L | 2 |
| 3 | 200P | ASYNCHRONOUS RC | P | 4 | L | 5 |
| 4 | 200P | LM | L | 2 | L | 3 |
| 5 | 200P | LM | L | 5 | L | 4 |
| 6 | 200P | ASYNCHRONOUS RC | L | 3 | R | 2 |
| 7 | 200P | ASYNCHRONOUS RC | L | 4 | R | 5 |
| 8 | 200P | LM | R | 2 | R | 3 |

Fig.7B  FAULT NOTIFICATION TABLE (LOCAL SITE)

144L

| NO | FAULT INFORMATION DESTINATION | PAIR DEFINING INFORMATION | | | | |
|---|---|---|---|---|---|---|
| | | COPY KIND | PRIMARY VOLUME | | SECONDARY VOLUME | |
| | | | STORAGE SYSTEM | VOLUME # | STORAGE SYSTEM | VOLUME # |
| 1 | P1 | LM | L | 2 | L | 3 |
| 2 | P1 | LM | L | 5 | L | 4 |
| 3 | P1 | ASYNCHRONOUS RC | L | 3 | R | 2 |
| 4 | P1 | ASYNCHRONOUS RC | L | 4 | R | 5 |
| 5 | P1 | LM | R | 2 | R | 3 |

Fig.7C  FAULT NOTIFICATION TABLE (REMOTE SITE)

144R

| NO | FAULT INFORMATION DESTINATION | PAIR DEFINING INFORMATION | | | | |
|---|---|---|---|---|---|---|
| | | COPY KIND | PRIMARY VOLUME | | SECONDARY VOLUME | |
| | | | STORAGE SYSTEM | VOLUME # | STORAGE SYSTEM | VOLUME # |
| 1 | L1 | LM | R | 2 | R | 3 |

Fig.8

FAULT MANAGEMENT TABLE

145P

| FAULTY VOLUME | | FAULT TYPE |
|---|---|---|
| STORAGE SYSTEM | VOLUME # | |
| R | 3 | VOLUME FAULT |

| FAULTY PATH (PHYSICAL PATH) | | | | FAULT TYPE |
|---|---|---|---|---|
| PRIMARY | | SECONDARY | | |
| STORAGE SYSTEM | I/O PORT # | STORAGE SYSTEM | I/O PORT # | |
| L | 1 | R | 1 | TIMEOUT |

Fig.9A  STORAGE SYSTEM INFORMATION

226

| STORAGE SYSTEM | P | L | R |
|---|---|---|---|
| VOLUME | 1 | 1 | 1 |
|  | 2 | 2 | 2 |
|  | 3 | 3 | 3 |
|  | 4 | 4 | 4 |
|  | 5 | 5 | 5 |

Fig.9B  ROUTE INFORMATION

227

| ROUTE # | PRODUCTION SITE | | LOCAL SITE | | REMOTE SITE | |
|---|---|---|---|---|---|---|
|  | STORAGE SYSTEM | COMMAND DEVICE | STORAGE SYSTEM | COMMAND DEVICE | STORAGE SYSTEM | COMMAND DEVICE |
| 1 | P | 1 | L | 1 | R | 1 |

Fig.9C  GROUP INFORMATION

228

| COPY KIND | PAIR # | PAIR STATUS | PRIMARY VOLUME | | SECONDARY VOLUME | | GROUP # |
|---|---|---|---|---|---|---|---|
|  |  |  | STORAGE SYSTEM | VOLUME # | STORAGE SYSTEM | VOLUME # |  |
| LM | 1 | NORMAL | P | 2 | P | 3 | 1 |
| LM | 2 | NORMAL | L | 2 | L | 3 | 2 |
| LM | 3 | NORMAL | L | 5 | L | 4 | 2 |
| LM | 3 | NORMAL | R | 2 | R | 3 | 3 |
| ASYNCHRONOUS RC | 1 | NORMAL | P | 3 | L | 2 | 1 |
| ASYNCHRONOUS RC | 2 | NORMAL | P | 4 | L | 5 | 1 |
| ASYNCHRONOUS RC | 3 | NORMAL | L | 3 | R | 2 | 2 |
| ASYNCHRONOUS RC | 3 | NORMAL |  |  | R | 4 |  |

Fig.10A  PATH INFORMATION

| PATH # | COPY KIND | GROUP # | PHYSICAL PATH ASSIGNMENT INFORMATION 299 | | | | PATH STATUS |
|---|---|---|---|---|---|---|---|
| | | | PRIMARY | | SECONDARY | | |
| | | | STORAGE SYSTEM | I/O PORT # | STORAGE SYSTEM | I/O PORT # | |
| 1 | ASYNCHRONOUS RC | 1 | P | 1 | L | 1 | NORMAL |
| 2 | ASYNCHRONOUS RC | 1 | P | 1 | L | 1 | USEABLE |
| 3 | - | - | P | 2 | L | 2 | NO PATH |
| 4 | ASYNCHRONOUS RC | 2 | L | 1 | R | 1 | NORMAL |
| 5 | ASYNCHRONOUS RC | 2 | L | 1 | R | 1 | NORMAL |

Fig.10B  FAULT MANAGEMENT TABLE

300

| FAULTY VOLUME | | FAULT TYPE |
|---|---|---|
| STORAGE SYSTEM | VOLUME # | |
| R | 3 | VOLUME FAULT |

| FAULTY PATH (PHYSICAL PATH) | | | | FAULT TYPE |
|---|---|---|---|---|
| PRIMARY | | SECONDARY | | |
| STORAGE SYSTEM | I/O PORT # | STORAGE SYSTEM | I/O PORT # | |
| L | 1 | R | 1 | TIMEOUT |

Fig.16A

| DESTINATION | CONTENT | VOLUME | |
|---|---|---|---|
| | | STORAGE SYSTEM | VOLUME # |
| P1 | CREATE FAULT NOTIFICATION VOLUME | P | 0 |

| DESTINATION | CONTENT | RESULT |
|---|---|---|
| 200P | FAULT NOTIFICATION VOLUME CREATION RESPONSE | COMPLETE |

| DESTINATION | CONTENT |
|---|---|
| P1 | CREATE FAULT NOTIFICATION VOLUME |

| DESTINATION | CONTENT | RESULT | VOLUME | |
|---|---|---|---|---|
| | | | STORAGE SYSTEM | VOLUME # |
| 200P | FAULT NOTIFICATION VOLUME CREATION RESPONSE | COMPLETE | P | 0 |

| DESTINATION | CONTENT | FAULTY VOLUME | | FAULT TYPE |
|---|---|---|---|---|
| | | STORAGE SYSTEM | VOLUME # | |
| L1 | FAULT NFORMATION | R | 3 | VOLUME FAULT |

Fig.22B

| DESTINATION | CONTENT | FAULTY PATH (PHYSICAL PATH) | | | | FAULT TYPE |
|---|---|---|---|---|---|---|
| | | PRIMARY | | SECONDARY | | |
| | | STORAGE SYSTEM | I/O PORT # | STORAGE SYSTEM | I/O PORT # | |
| P1 | FAULT NFORMATION | L | 1 | R | 1 | TIMEOUT |

Fig.26A

| DESTINATION | CONTENT | VOLUME | |
|---|---|---|---|
| | | STORAGE SYSTEM | VOLUME # |
| P1 | STATUS NOTIFICATION | P | 0 |

| DESTINATION | CONTENT | FAULTY VOLUME | | FAULT TYPE |
|---|---|---|---|---|
| | | STORAGE SYSTEM | VOLUME # | |
| 200P | STATUS NOTIFICATION RESPONSE | R | 3 | VOLUME FAULT |

| ROUTE # | STORAGE SYSTEM | COMMAND DEVICE | STORAGE SYSTEM | COMMAND DEVICE | STORAGE SYSTEM | COMMAND DEVICE |
|---|---|---|---|---|---|---|
| 1 | P1 | 1 | L | 1 | R1 | 1 |
| 2 | P1 | 1 | L | 1 | R2 | 1 |
| 3 | P1 | 1 | L | 1 | P2 | 1 |

| ROUTE # | STORAGE SYSTEM | COMMAND DEVICE | STORAGE SYSTEM | COMMAND DEVICE | STORAGE SYSTEM | COMMAND DEVICE |
|---|---|---|---|---|---|---|
| 1 | P2 | 1 | L | 1 | R1 | 1 |
| 2 | P2 | 1 | L | 1 | R2 | 1 |
| 3 | P2 | 1 | L | 1 | P1 | 1 |

| ROUTE # | STORAGE SYSTEM | COMMAND DEVICE | STORAGE SYSTEM | COMMAND DEVICE | STORAGE SYSTEM | COMMAND DEVICE |
|---|---|---|---|---|---|---|
| 1 | R1 | 1 | L | 1 | P1 | 1 |
| 2 | R1 | 1 | L | 1 | P2 | 1 |
| 3 | R1 | 1 | L | 1 | R2 | 1 |

COMPUTER SYSTEM INCLUDING NOVEL FAULT NOTIFICATION RELAY

CROSS REFERENCE TO RELATED APPLICATIONS

This application relates to and claims priority from Japanese Patent Application No.2004-315849, filed on Oct. 29, 2004, the entire disclosure of which is incorporated by reference.

BACKGROUND

The present invention relates to a computer system composed of a computer and storage systems, and in particular relates to a technology for managing fault.

Remote copy technology is commonly used in order to enhance data reliability in computer systems that include a computer and storage systems for storing data. Some computer systems that employ remote copy technology are equipped with multiple storage systems connected by means of data lines (e.g. Fibre Channel) to make up a network, and a computer connected to some of these multiple storage systems. In such a computer system, both storage systems that are connected to the computer and storage systems that are not connected to the computer are present.

Technologies using cascading commands to control storage systems not connected to a computer are known. Specifically, the computer issues a cascading command includes information about the cascading route to a storage system targeted for control and a command to the targeted storage system. In accordance with the information about the cascading route, the issued cascading command is cascaded from the storage system connected to the computer to the storage system targeted for control over the storage system network. The storage system targeted for control then executes processing in accordance with the received cascading command. The response includes the processing result etc. is sent back over the cascading route of the cascading command from the storage system targeted for control to the computer.

In a conventional computer system, by means of the cascading commands described above, the computer is notified of a fault occurring in a storage system not connected to the computer. Specifically, the computer periodically issues cascading commands to request notification of fault, the cascading commands being addressed to particular storage systems. And in response to the cascading commands the storage systems notify the computer of fault occurring in the storage systems themselves.

SUMMARY

However, in the conventional computer system described above, the computer must periodically execute the processing of issues and responses about the cascading commands regardless of whether a fault has actually occurred. Therefore, there was a risk of placing an appreciable load on the computer. In each storage system as well (excluding storage systems connected to network terminals), in addition to processes relating to a fault in the storage system itself, it was also necessary to process sending of information relating to a fault in other storage systems as well, which posed a similar risk of placing an appreciable load on the storage systems. Additionally, since fault of a storage system is typically managed in units that are a combination of two storage areas, i.e. a copy source and a copy destination (a copy pair), cascading commands are issued on a per-copy pair basis. In this case, where the computer system is equipped with large-capacity storage systems that have large numbers of copy pairs, the problem of an extremely large processing load in association with fault notification may result.

The aspects described hereinbelow are directed to addressing the aforementioned problems at least in part, and have as an object to reduce the load of processes associated with notifying the computer of storage system fault in a computer system.

A first aspect provides a computer system comprising a computer, first storage system configured to be communicable with the computer, and a second storage system configured to be communicable with the first storage system. The second storage system identifies the first storage system able to communicate with the second storage system, detects fault occurring in the second storage system, and transmits fault information to the identified first storage system, the fault information being related to the detected fault. The first storage system notifies the computer of the transmitted fault information.

According to the computer system of the first aspect, the second storage system transmits the fault information related to fault occurring in itself to the identified first storage system. The first storage system notifies the computer of the transmitted fault information. As a result, even without an instruction, query, or other process from the computer to the second storage system, the computer will be notified of fault information from the second storage system. Accordingly, the processing load for the computer to acquire fault information from the second storage system is reduced.

The computer system of the first aspect may further comprise a third storage system configured to be communicable with the second storage system. The third storage system may identify the second storage system that is capable of communicating with the third storage system, and may transmit fault information to the identified second storage system wherein the fault information is related to the detected fault. And the second storage system further may receive the fault information from the third storage system, and transmit the received fault information to the first storage system.

In this case, fault information from the third storage system is ultimately transmitted to the first storage system. And then the first storage system notifies the computer of the fault information by the first storage system. As a result, even without an instruction, query, or other process from the computer to the third storage system, the computer will be notified of fault information from the third storage system. Accordingly, the processing load for the computer to acquire fault information from the third storage system is reduced.

A second aspect provides a storage system comprising a first interface configured to communicate with an external device, a second interface configured to communicate with a first external storage system, a controller connected to the first interface and to the second interface, and a plurality of storage devices connected to the controller. The controller receives fault information relating to a fault in the first external storage system, detects fault occurring in the storage system. And when the external device is a computer, the controller notifies the computer via the first interface of the received fault information or of fault information relating to the detected fault. On the other hand, when the external device is a second external storage system situated on the communication route leading to the computer, the controller notifies the second storage system via the first interface of the received fault information or of fault information relating to the detected fault.

The storage system of the second aspect of the invention transmits acquired fault information (fault detected in the system itself, or fault information received from another storage system) to the computer or to another storage system (herein also referred to as an external storage system) situated on the communication route leading to the computer. As a result, where a computer system is made up of the storage systems of the second aspect, fault information in the storage systems is transmitted sequentially over communication route leading to the computer, whereby the computer is ultimately notified of the fault information. As a result, even without an instruction, query, or other process from the computer to the storage systems, the computer will be notified of fault information from the storage systems, reducing the processing load on the computer.

Other aspect may be a display method for displaying fault in a computer system in which the computer is equipped with a display device, wherein the computer identify the fault that has occurred using the notified fault information, and displays the identified fault on the display device. In this case, even without an instruction, query, or other process from the computer to a storage system, the computer can display fault in a storage system. Accordingly, the processing load required for the computer to display storage system fault is reduced.

The invention may be reduced to practice in various aspects as well. For example, it could be reduced to practice as a method for managing fault, a computer program for realizing such a method, or a recording medium having such a program recorded thereon. The display method described above could be reduced to practice as a display program, or a recording medium having a display program recorded thereon.

The above and other objects, features, aspects, and advantages of the present invention will become more apparent from the following detailed description and the accompanying drawings.

BRIEF DESCRIPTION OF THE DRAWINGS

FIGS. 5A-5C are illustrations showing examples of various kinds of information stored in shared memory;

FIGS. 7A-7C are illustrations showing examples of fault notification tables stored in shared memory;

FIG. 8 is an illustration showing the fault notification table stored in shared memory;

FIGS. 9A-9C are illustrations showing examples of various kinds of information stored in memory in the host computer;

FIGS. 10A-10B are illustrations showing examples of various kinds of information stored in memory in the host computer;

FIGS. 16A-16D are illustrations showing a command and a command response used in the fault notification volume creation process;

FIG. 22A-22B are illustrations showing examples of fault information transmitted/notified by a storage system;

FIGS. 26A-26B are illustrations showing a status notification command and a command response to the status notification command;

FIGS. 34A-34C are illustrations of route information stored in memory in three host computers.

DESCRIPTION OF THE PREFERRED EMBODIMENTS

The embodiment of the invention is described with reference to the accompanying drawings.

A. Embodiment

Figure 1:
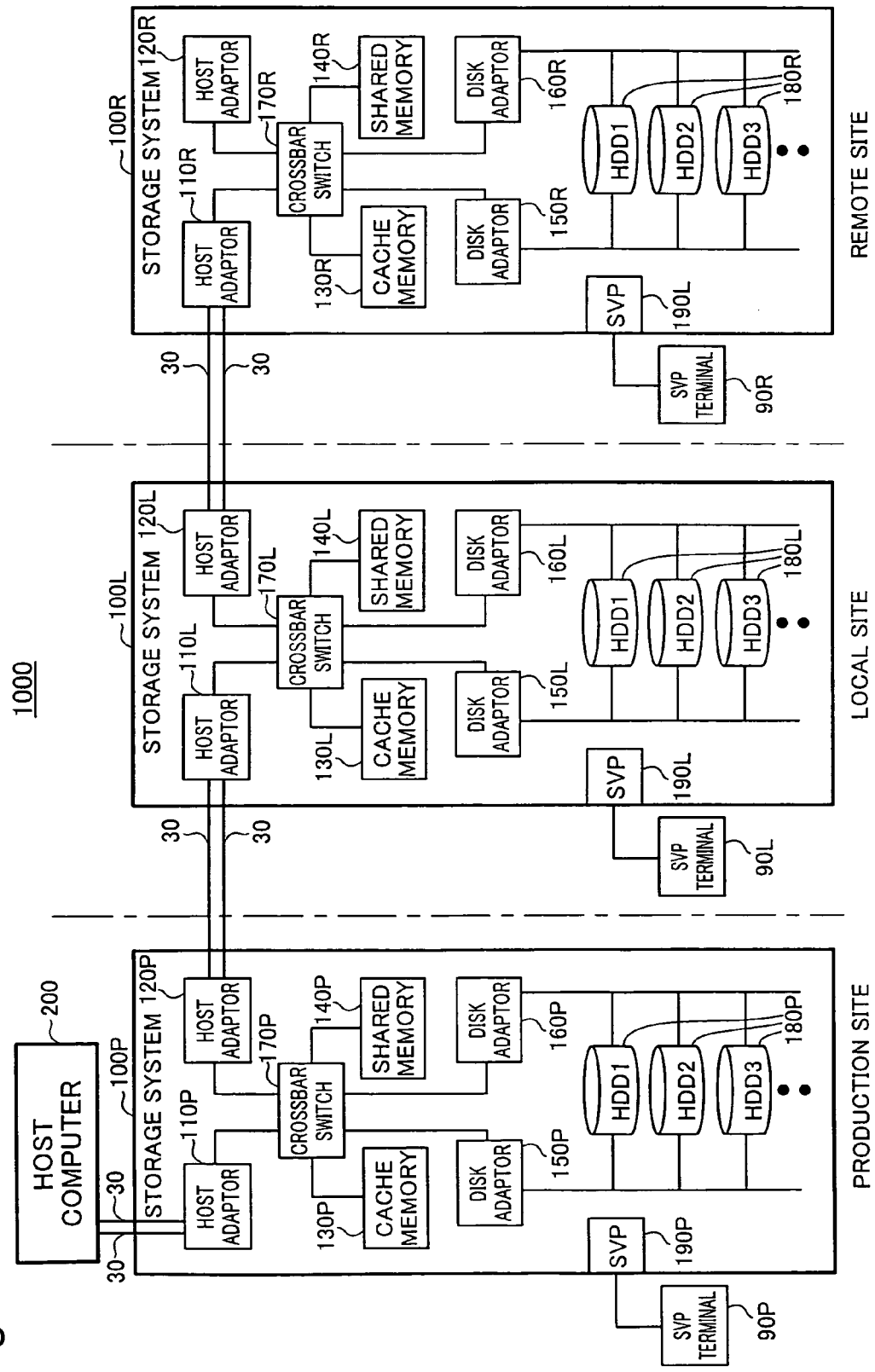
FIG. 1 is an illustration showing a simplified arrangement of the computer system pertaining to a embodiment.
Figure 2:
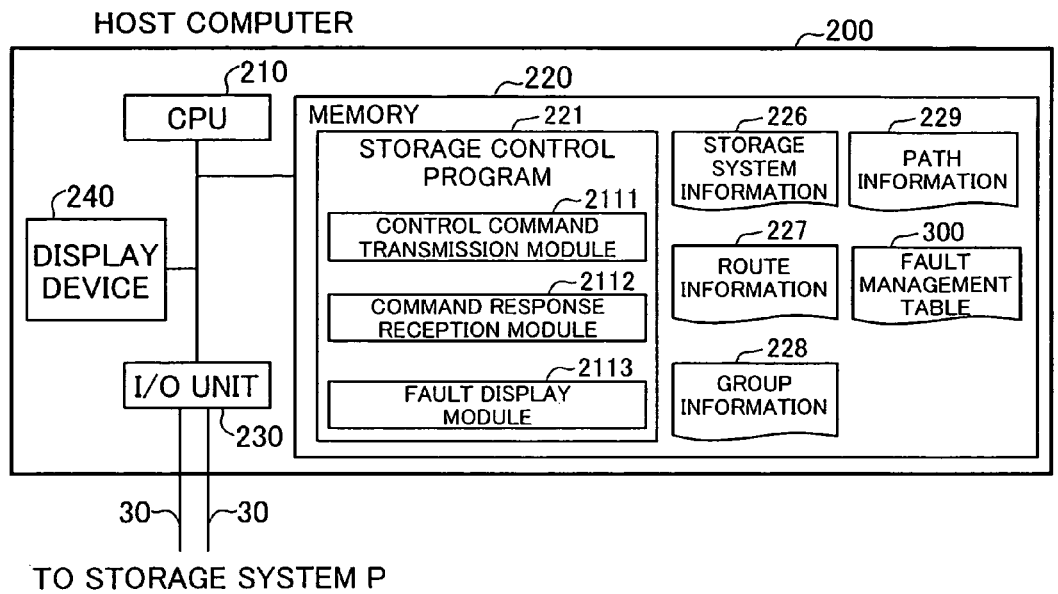
FIG. 2 is a block diagram showing the internal arrangement of the host computer in the embodiment.
Figure 3:
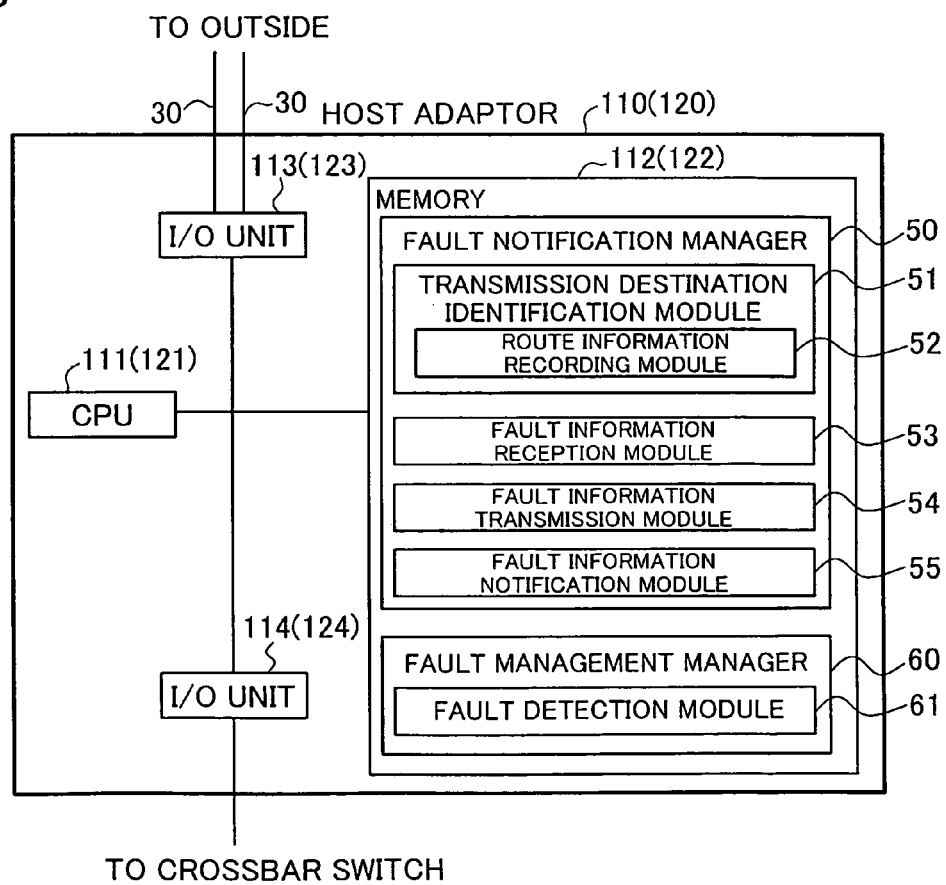
FIG. 3 is a block diagram showing the internal arrangement of the host adaptor of a storage system in the embodiment.
Figure 4:
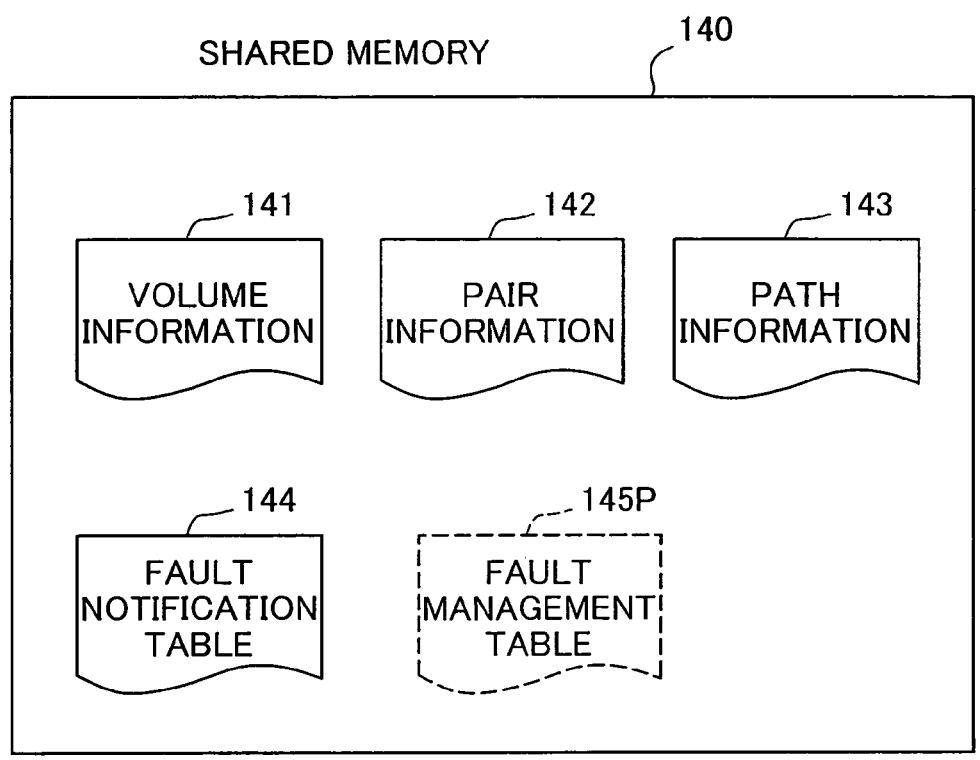
FIG. 4 is a block diagram showing the internal arrangement of the shared memory of a storage system in the embodiment.

A-1. Arrangement of Computer System:

The following description of the computer system pertaining to the embodiment, hardware arrangement of the storage systems and the host computer making up the computer system, makes reference to FIGS. 1-4. FIG. 1 is an illustration showing a simplified arrangement of the computer system pertaining to the embodiment. FIG. 2 is a block diagram showing the internal arrangement of the host computer in the embodiment. FIG. 3 is a block diagram showing the internal arrangement of the host adaptor of a storage system in the embodiment. FIG. 4 is a block diagram showing the internal arrangement of the shared memory of a storage system in the embodiment.

The computer system 1000 pertaining to the embodiment comprises a host computer 200 as the computer, and storage systems 100P, 100L, 100R. The host computer 200 and the storage system 100P are situated at a production site at which data processing activities are carried out. The storage system 100L is situated at a local site in proximity to the production site. The storage system 100R is situated at a remote site situated at a physically remote location from the production site.

Herein, a symbol identifying the site at which an element is situated is suffixed to the symbols that indicate the storage systems, various constituent elements, and various kinds of information and programs. That is, the symbol "P" suffixed to a symbol indicates that the element is located at the production site, an "L" that it is located at a local site, and an "R" that it is located at a remote site, respectively. Additionally, in the description herein, in instances where there is no particular need to distinguish among site, the site symbol suffix to a symbol is omitted.

The host computer 200 is connected to the production site storage system 100P by means of a data line 30. The production site and remote site storage systems 100P and 100R are each connected to the local site storage system 100L by means of data lines 30. The data lines 30 are lines (e.g. SCSI, Fibre Channel) for sending and receiving among interconnected devices data stored in the storage systems, and commands for controlling the storage systems, described later. Specifically, the storage system 100P is a storage system able to communicate with the host computer 200, without going through any other storage system 100. The storage system 100L, on the other hand, is a storage system able to communicate with the storage system 100P. The storage system 100R is a storage system able to communicate with the storage system 100L.

The host computer 200 controls all of the storage systems 100 in the computer system 1000, as well as executing data processing tasks. For example, the host computer 200 carries out interchange of information with the storage system 100P connected to the host computer 200, and performs various controls and settings of the storage systems 100P, 100L, 100R.

As shown in FIG. 2, the host computer 200 includes a CPU 210, memory 220, a display device 240, and a I/O unit 230 for data and command interchange with the storage systems 100. The I/O unit 230 has a plurality of I/O ports enabling connection to a plurality of data lines 30 (two in the illustration). The memory 220 stores various application programs (omitted in the drawing) for execution by the CPU 210, storage system information 226, route information 227 indicating the connection configuration of the storage systems 100 under control, group information 228 representing information for all copy pairs and copy groups configured in the storage systems 100, path information 229 representing information for all paths established among the storage systems, and a fault management table 300 in which is recorded fault information notified by the storage system 100P. The memory 220 also holds a storage control program 221 for controlling the storage systems 100.

The storage control program 221 includes a control command transmission module 2211 for transmitting the various commands described later from the host computer 200 to storage systems 100 targeted for control; a command response reception module 2212 for receiving command responses to control commands; and a fault display module 2213 that identify a fault that has occurred using fault information, described later, and display it on the display device 240.

The storage systems 100 each include two or more host adaptors 110, 120, a cache memory 130, a shared memory 140, two or more disk adaptors 150, 160, a crossbar switch 170, a plurality of hard disk drives (HDD) 180 as memory devices, and a service processor (SVP) 190. Except for the SVP 190 and HDD 180, the elements 110-160 are selectively connected by means of the crossbar switch 170.

The host adaptor 110 is a controller that is responsible for data sending and receiving among storage system 100 and external devices (e.g. the host computer 200 or other storage systems 100), and for overall control of the storage systems 100. As shown in FIG. 3, the host adaptor 110 includes a CPU 111, memory 112, an I/O unit 113 for sending and receiving data, commands etc. among storage system 100 and external devices (e.g. the host computer 200 or other storage system 100), and an I/O unit 114 for sending and receiving data etc. with other elements in the storage system 100 via the crossbar switch 170. The I/O unit 113 has a plurality of I/O ports enabling connection to a plurality of data lines 30 (two in the illustration) for external connections. The I/O unit 113 further includes a circuit (omitted in the drawing) that recognizes data line (physical path) status individually for the plurality of I/O ports, and that in the event that status is not normal, notifies the host adaptor 110 (CPU 110) of the status. The I/O unit 113 is an interface able to communicate with the host computer 200 or other external device, for example, other storage system 100 situated on the communication route to the host computer 200. The memory 112 includes a fault notification manager 50 and a fault management manager 60, as well as a control program (omitted in the drawing) which is a program (omitted in the drawing) for controlling communication between the host adaptor 110 and external device or internal elements. The fault notification manager 50 is responsible for transmission/notification of fault information. The fault management manager 60 is responsible for managing internal fault of the storage system 100.

The fault notification manager 50 includes a transmission destination identification module 51 that identifies the host computer 200 or storage system 100 for which transmission/notification of fault information is destined, a fault information reception module 53 for receiving fault information transmitted from other storage systems, a fault information transmission module 54 for transmitting fault information to other storage system with which it can directly communicate, and a fault information notification module 55 for notifying the host computer 200 with which it can directly communicate of fault information. The transmission destination identification module 51 includes a route information recording module 52 that records information to identify the sender of a command (control command), in the form of the fault notification route information indicating the destination of fault information, in a fault notification table 144.

The host adaptor 110 is designed to be able to connect to the host computer 200 as the host adaptor 110P of the storage system 100P, or to connect with another storage system 100 as the host adaptor 110L of the storage system 100L. The fault information notification module 55 of the fault notification manager 50 mentioned previously is a module that functions in a host adaptor 100 connected to the host computer 200, as with the host adaptor 110P. The fault information transmission module 54, on the other hand, functions in a host adaptor 100 connected to another storage system 100, as with the host adaptor 110L.

The other host adaptor 120 has an arrangement similar to the host adaptor 110 described above, so same elements are denoted by the symbol in parentheses in FIG. 3, without providing a detailed description. Here, the I/O unit 123 provided to the host adaptor 120 is an interface that, where the computer system is configured as shown in FIG. 1, is able to communicate with a storage system not connected to the host computer 200 (in this embodiment, storage system 100L or 100R), for receiving fault information (described in detail later) transmitted from the storage system connected to it.

The cache memory 130 temporarily stores data written to the HDD 180 and data read from the HDD 180.

The shared memory 140 is a memory shared by the host adaptors 110, 120 and the disk adaptors 150, 160. As shown in FIG. 4, in the shared memory 140 are stored various kinds of information, namely, volume information 141, pair information 142, path information 143, and fault notification information 144. In the shared memory 140P belonging to the storage system 100P able to directly communicate with the host computer 200, a fault management table 145P is stored.

The disk adaptors 150, 160 are connected to the HDD 180 and control writing of data to the HDD 180 and reading of data from the HDD 180. Like the host adaptors 110, the disk adaptors 150, 160 includes a CPU, memory, and I/O unit.

The SVP 190 is a processor of known design, responsible for maintenance of the storage system 100 as a whole. While not shown in the drawing, the SVP 190 is connected via control lines (e.g. Ethernet™ connections) to the other elements in the storage system 100 (e.g. the disk adaptors 150, 160, the host adaptors 110, 120). An SVP terminal 90 is connectable (e.g. by an RS-232C connection or Ethernet connection) to the SVP 190, enabling the user to perform maintenance-related control of the storage system or to acquire maintenance-related information in the storage system 100.

Figure 6:
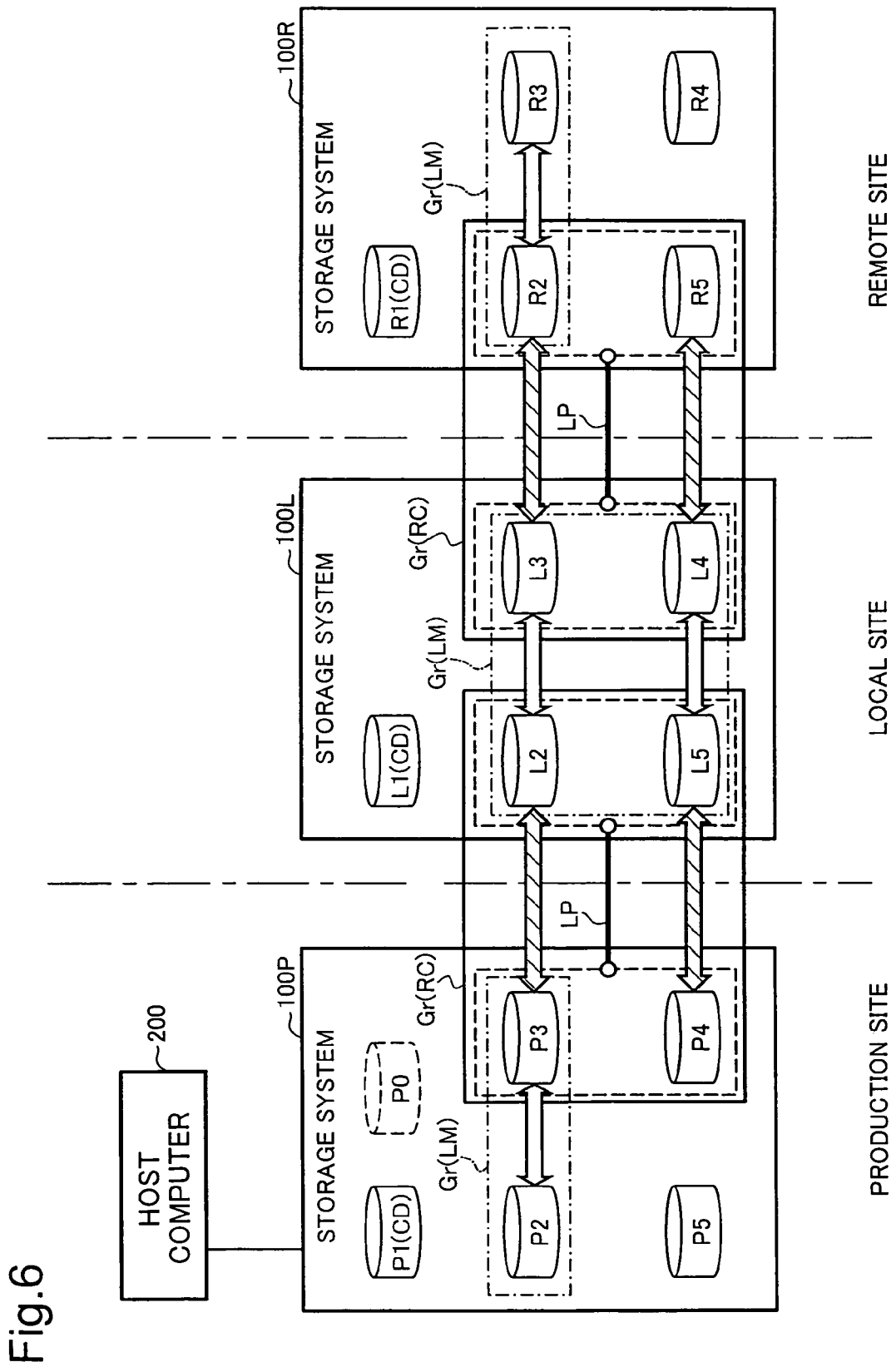
FIG. 6 is a conceptual depiction of the arrangement of copy pairs configured in the storage systems.

The following description of various kinds of information stored in the shared memory 140 and of the volumes configured in the storage systems 100 makes reference to FIGS. 5A-8. FIGS. 5A-5C are illustrations showing an example of various kinds of information stored in the shared memory 140. In FIGS. 5A-5C, the example of information stored in the shared memory 140P of the production site storage system 100P is used. FIG. 5A shows volume information 141P, FIG. 5B shows pair information 142P, and FIG. 5C shows path information 143P. FIG. 6 is a conceptual depiction of the arrangement of copy pairs configured in the storage systems 100. FIGS. 7A-7C are illustrations showing examples of fault notification tables 144P, 144L, 144R stored in the shared memory 140 of each storage system 100. FIG. 8 is an illustration showing the fault notification table 145 stored in the shared memory 140 of each storage system 100.

In the storage systems 100 pertaining to this embodiment, the copy pairs configured in the storage systems are managed by means of the volume information 141, pair information 142, and path information 143 shown in FIGS. 5A-5C. For example, for the purposes of the following description let it be assumed that copy pairs have been configured as shown in FIG. 6. Here, a copy pair refers to a combination of one logical volume (hereinafter termed primary volume) and another logical volume (hereinafter termed secondary volume) storing a copy of the data stored in the one logical volume. Once a copy pair has been configured, a copy process (e.g. total copying, differential copying etc.) is carried out periodically between the copy pair. By so doing the reliability of data stored in the storage system 100 is enhanced. Here, total copying refers to copying of all data stored in the primary volume to the secondary volume. Differential copying, on the other hand, refers to copying to the secondary volume only data in the primary volume that has been updated. Here, in order to facilitate management of the plurality of HDD 180 shown in FIG. 1, in the computer system 1000, the plurality of HDD 180 shown in FIG. 1 are viewed as a single logical memory area, this logical memory area being managed by being partitioned into a multitude of memory areas. The aforementioned logical volume refers to these partitioned memory areas. Herein, the term volume refers to this logical volume.

The volume information 141 is information to manage storage system volumes, and as shown in FIG. 5A contains volume number, volume status, copy kind, pair number, group number, HDD number, and capacity. The volume number is an identifier that identifies the volume, and is assigned on a per-volume basis. In the example in FIG. 6, P1-P5 are volumes corresponding to volumes #1-5 in storage system 100P. Herein, as shown in FIG. 6, volumes may be distinguished by means of the combination of the symbol assigned to the storage system (P, L, R) and the volume number. For example, volume #3 in storage system 100R is denoted as volume R3.

Volume status indicates the status of the volume, e.g. normal, abnormal, or unused. Normal refers to a condition in which the volume is part of a copy pair and is functioning normally. Abnormal refers to a condition in which the volume is part of a copy pair, but is experiencing problems in reading or writing data. For example, in the event that the HDD 180 corresponding to a volume was experiencing problems, the volume would be designated as abnormal. Unused refers to a condition in which the volume is not part of a copy pair. However, in the event that the volume has been assigned as a fault notification volume or as a command device, it will be indicated that the volume is a command device or fault notification volume.

The fault notification volume is denoted by broken lines in FIG. 6; these are employed in fault notification, described later. The fault notification volume is a "virtual" volume. A virtual volume refers to a volume that has a logical address and that can be recognized by the host computer 200, but that is not associated with any physical address in an HDD180 and cannot actually be written to or read from. A fault notification volume is configured on for the storage system 100P which is able to communicate with the host computer 200; in the embodiment, as shown in FIG. 6, volume #0 of the storage system 100P has been set up as a fault notification volume. As will be described later, the host computer 200 can access the fault notification volume by means of transmitting a control command directed to the fault notification volume.

The command device is a special volume different from other logical volumes in that, when the host computer 200 transmits a command (described later) to the storage system 100 (for the storage system 100 not connected to it, direct transmission is not possible to transmission takes place via another storage system), the command device being specified as the destination for the command. In each of the storage systems 100P, 100L, 100R, one volume is designated as a command device. In this embodiment, as shown in FIG. 6, volume #1 in each storage system 100P, 100L, 100R, namely, volumes P1, L1, R1, are assigned as command devices. In the embodiment, the command device is specified as the destination for fault information during transmission of fault information as well, described later. The command device is used only in processes relating to control and fault monitoring, and is not used to store ordinary data.

Copy kind indicates the kind of the copy pair made up by the volume. Copy kinds include local mirror (LM) and remote copy (RC). A local mirror is a copy pair made up of volumes on the same given storage system 100. For example, volume P2 and volume P3 in FIG. 6 form a local mirror. In FIG. 6, volumes connected by white arrows indicate those forming local mirrors. A remote copy is a copy pair made up of a volume on one storage system 100 and a volume on another storage system 100. For example, in FIG. 6, volume P3 and volume L2 make up a remote copy. In FIG. 6, volumes connected by hatched arrows indicate those forming remote copies. Further, there are two kinds of remote copies, namely, synchronous remote copies (synchronous RC) and asynchronous remote copies (asynchronous RC). To explain in brief, with a synchronous remote copy, when there is a command to write data to the primary volume, after writing the data to the primary volume and then writing the data to the secondary volume, execution of the data write command terminates. With an asynchronous remote copy on the other hand, when there is a command to write data to the primary volume, after writing the data to the primary volume, execution of the data writ command terminates, and writing of data to the secondary volume is carried out in the background.

Pair number is an identifier that identifies a copy pair; in the embodiment, it is assigned on a copy kind basis. For example, they are assigned to copy pairs in the manner local mirror #1, #2 . . . , asynchronous remote copy #1, #2 . . . and so on.

Group number is an identifier that identifies a copy group. Here, the copy group refers to a group of one or more copy pairs of the same kind. By controlling and managing copy pairs in copy group units, control and management of the computer system 100 may be simplified. In FIG. 6, the group Gr-LM enclosed by the dotted-and-dashed lines is one local mirror copy group. The group Gr-RC enclosed by the solid lines is one remote copy copy group. HDD number is an identifier that identifies the HDD 180 corresponding to a volume. Capacity refers to the storage capacity of the volume (e.g. 3 gigabytes).

With regard to information relating to volumes, even more detailed information (e.g. an address map recording physical addresses of HDD corresponding to volumes, accessible I/O port information.) is also recorded in other tables, but will not be described here.

Pair information 142 is information for one storage system 100 to manage copy pairs composed of the volumes in the one storage system; as shown in FIG. 5B, it includes copy kind, pair number, pair status, primary volume identifying information, secondary volume identifying information, and group number. Copy kind and pair number are analogous to information of the same name in the volume information 141 described earlier. Pair status takes a value of normal, abnormal, unused, uncopied, or copying. Where pair status is normal, this means that the copy process is being carried out normally. Where pair status is abnormal, this means that the copy process cannot be carried out. Where pair status is unused, this means that information of the pair number is not valid. Where pair status is copying, this means that initial copying, described later, is in-process. Where pair status is uncopied, this means that the initial copy process has not yet been executed.

Path information 143 is information for one storage system 100 to manage the logical path that links a volume of the one storage system with a volume of another storage system, in one remote copy copy pair including the volume of the one storage system. To a logical path there is assigned at least one line among the plurality of data lines 30 (also termed physical paths) that connect the first storage system with the other storage system via the I/O unit (113 or 123) of the host adaptor (110 or 120). Hereinafter, the term path shall be used to refer to such a logical path. In the embodiment, a path is established for each individual remote copy copy group, with the same logical path being established for all copy pairs in a copy group. In FIG. 6, path LP denotes a path established for the remote copy copy group Gr-RC.

Path information 143 includes path number, copy kind, group number, and physical path assignment information. Path number is an identifier that identifies the path, and is assigned on a path-by-path basis. Copy kind and group number are analogous to the information of the same name in the volume information 141 described earlier. Physical path assignment information is information that defines the data line 30 (physical path) assigned to the path (hereinafter termed path defining information). A data line 30 (physical path) is defined by specifying the I/O ports to which the data line is connected at both ends. That is, as shown in FIG. 5C, the storage systems having both the primary and secondary volumes, and I/O port numbers identifying the I/O ports provided to the storage systems (this would correspond one of the I/O ports provided to the I/O unit 114 (124) of the host adaptor in FIG. 3) are recorded.

The fault notification table 144 will now be described. The fault notification table 144 is a table that records information used for identifying the transmission/notification destination (hereinafter termed fault notification route information) in the fault notification process which will described later. The identified transmission/notification destination is used, when fault information is acquired by a storage system and the fault information is to be transmitted to another storage system or notified the host computer 200 of. As shown in FIGS. 7A-7C, the fault notification route information includes fault information destination and pair defining information. As the fault information destination, is recorded the command device of the storage system or the host computer which is to receive transmission/notification of the fault information. Pair defining information is information used for identifying the copy pair to which acquired fault information relates, and is recorded in association with the fault information destination mentioned above. As shown in FIGS. 7A-7C, pair defining information includes copy kind, storage systems to which the primary and secondary volumes belong, and volume numbers needed to identify a copy pair.

The fault management table 145P will now be described. In the fault management table 145P, is recorded fault information to notify the host computer 200, the fault management table 145P being stored only in the shared memory 140P of the storage system 100P which is able to directly communicate with the host computer 200. It is not stored in the shared memories 140L, 140R of the storage systems 100L, 100R not directly connected to the host computer 200. In the embodiment, The fault information recorded in the table 145P includes information to identify the fault location (a volume or path) where fault has occurred, and the fault type (volume fault, timeout).

The following description of various kinds of information stored in the memory 220 of the host computer 200 makes reference to FIGS. 9A-9C and FIGS. 10A-10B. FIGS. 9A-9C are illustrations showing examples of various kinds of information stored in memory 220 in the host computer 200. FIGS. 10A-10B are also illustrations showing examples of various kinds of information stored in memory 220 in the host computer 200.

Storage device information 226 (FIG. 9A) consists of a list of storage systems and storage system volumes. The host computer 200 refers to the storage device information 226 in order to recognize the storage systems and storage system volumes under its management.

Route information 227 (FIG. 9B) indicates the connection route from the host computer 200 to each storage system. In the embodiment, storage systems are connected in series from the host computer, in the order storage system 100P—storage system 100L—storage system 100 R, so as shown in FIG. 9B there is only one connection route (route #1). In the event that the storage system connection arrangement is more complicated, a plurality of connection routes will be recorded; this is discussed later. In route information 227 are recorded a storage system 100 identifier (in the embodiment, P, L, etc.) and a command device identifier (in the embodiment, the volume #1 assigned to the command device) in order of connection from the host computer. The connection route recorded in route information 227 constitutes the command communication route. Accordingly, the host computer 200, by referring to the route information 227, can verify the command communication route. The reason that a command device identifier is recorded is that, as noted, commands are issued with the command device as the issuing destination.

Group information 228 (FIG. 9C) as an item is analogous to the pair information 142 provided in the shared memory 140 of each of the storage systems described previously. However, whereas pair information 142 includes only information about the copy pair formed by the volume of the storage system whose information is being furnished, group information 228 includes information for all copy pairs under management by the host computer 200. In the case of the embodiment, group information 228 is information combining pair information 142P, 142L, 142R for each of the storage systems 100P, 100L, 100R. By referring to the group information 228, the host computer 200 can recognize all copy pairs under its management. Here, the information is referred to as group information rather than pair information because, out of consideration inter alia for user convenience, in the host computer 200 copy pairs are managed in copy group units.

Path information 229 (see FIG. 10A) as an item is analogous to the path information 143 provided in the shared memory 140 of each of the storage systems described previously. However, whereas the path information 142 of the shared memory 140 includes only path information relating to the copy pair (remote copy) formed by the volume of the storage system whose information is being furnished, path information 229 includes path information relating to all copy pairs (remote copies) under management by the host computer 200. Specifically, in the case of the embodiment, path information 229 is information combining path information 143P, 143L, 143R for each of the storage systems 100P, 100L, 100R. By referring to the path information 229, the host computer 200 can recognize all paths under its management.

The fault management table 300 see FIG. 10B) records fault information reported by the storage system 100P that can communicate with the host computer 200. Thus, as an item, it is analogous to the fault management table 145P stored in the shared memory 140P of the aforementioned storage system 100P. The host computer 200, by referring to the fault management table 300, can manage faults in storage systems 100 under its management.

A-2. Operation of Computer System

A-2-1. Storage System Control

Figure 11:
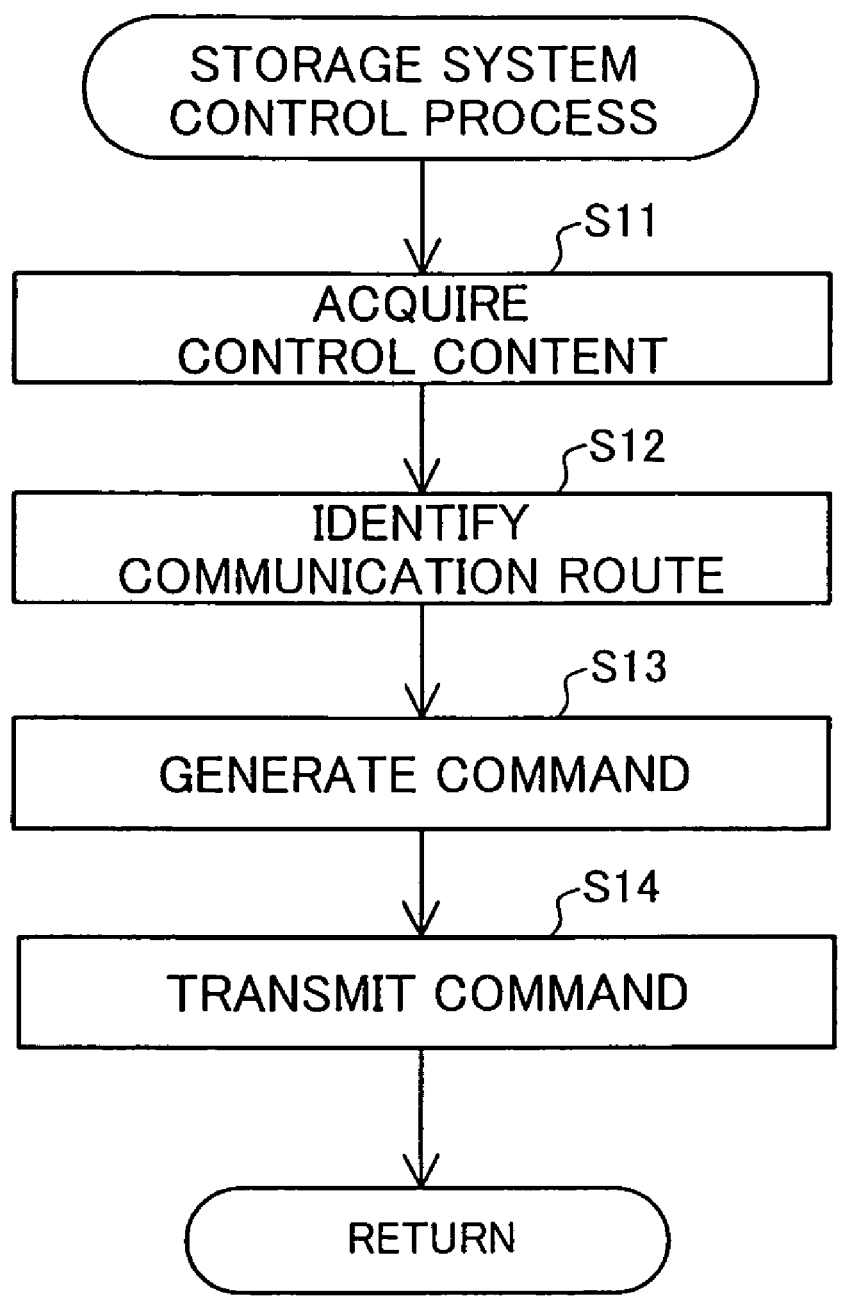
FIG. 11 is a flowchart showing the processing routine of the storage system control process.
Figure 12:
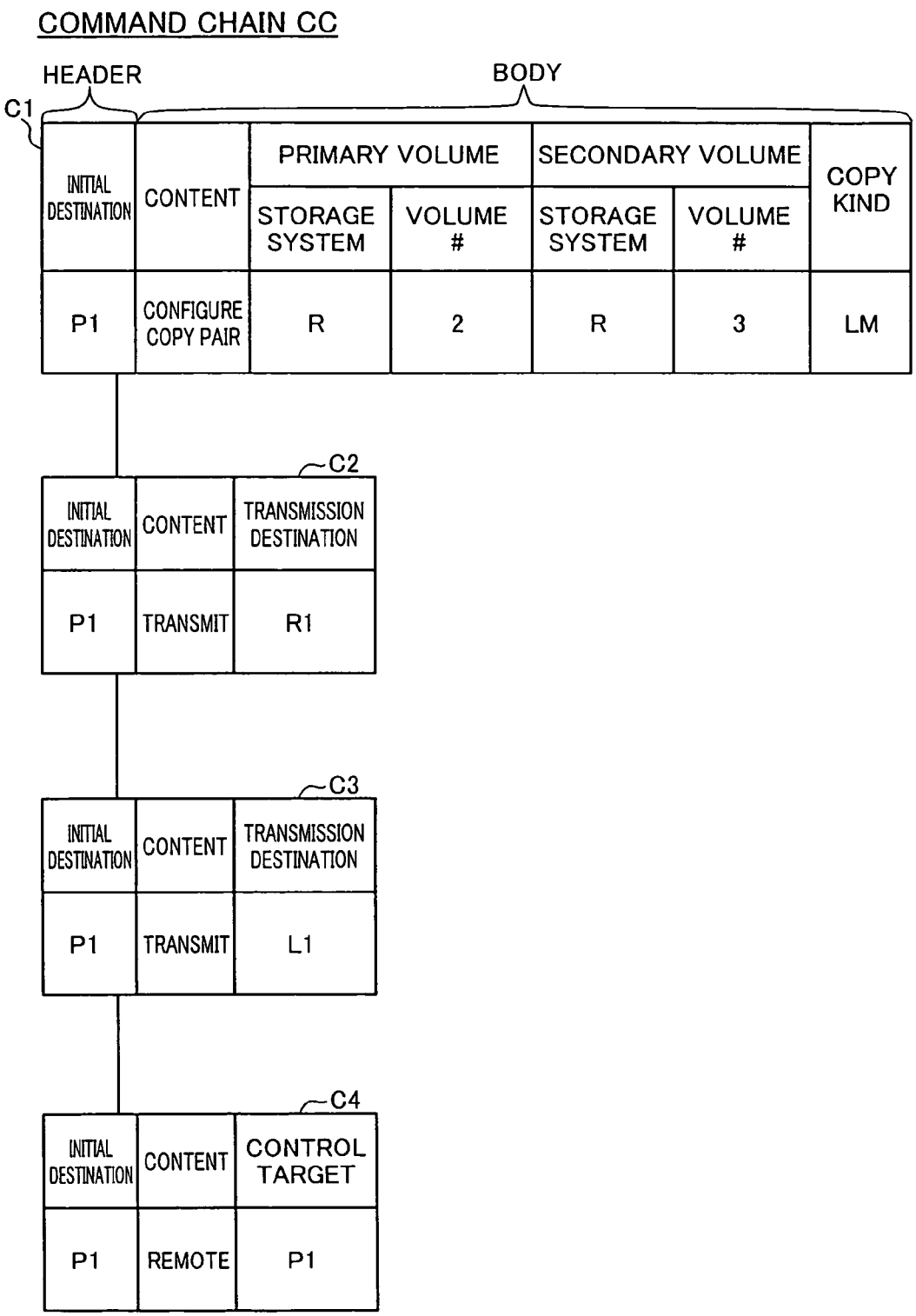
FIG. 12 is a conceptual depiction of the command chain generated by the host computer.
Figure 13:
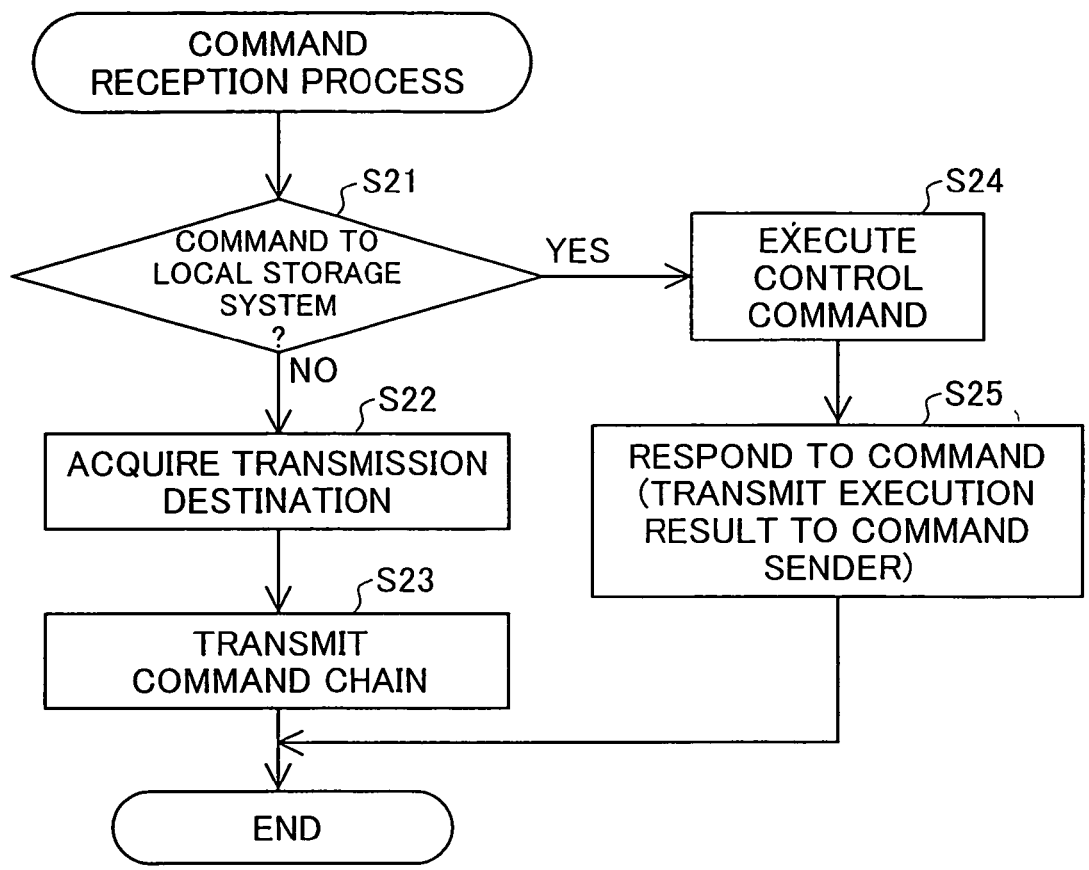
FIG. 13 is a flowchart showing the processing routine of the command reception process executed by the host adaptor of a storage system that has received a command.
Figure 14:
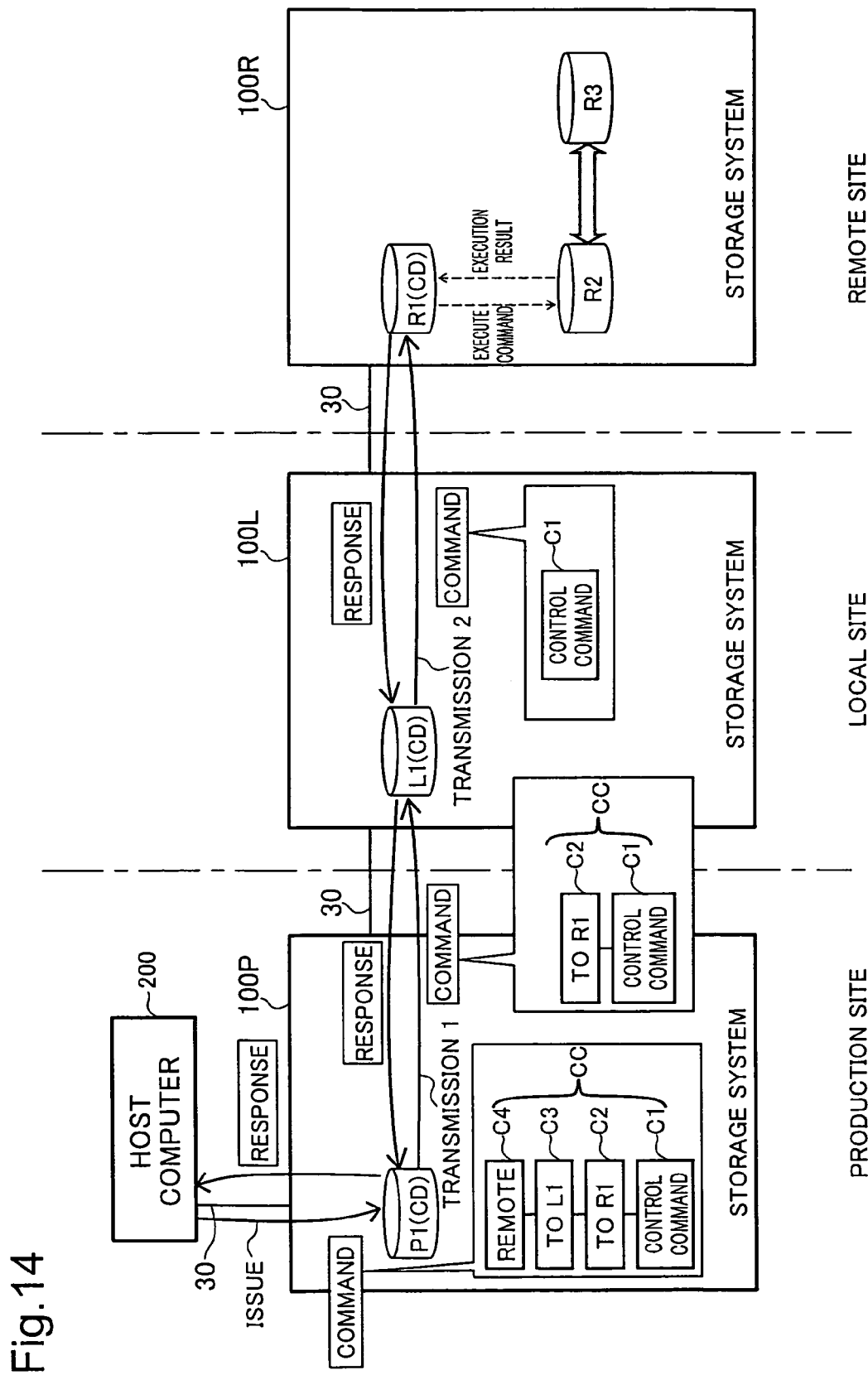
FIG. 14 is a conceptual depiction of a command chain being transmitted to a storage system at a remote site.

The following description of processes for control of the storage systems 100P, 100L, 100R by the host computer 200 (CPU 210) (hereinafter referred to as storage system control processes) makes reference to FIGS. 11-14. FIG. 11 is a flowchart showing the processing routine of the storage system control process executed by the host computer 200. FIG. 12 is a conceptual depiction of the command chain generated by the host computer 200. FIG. 13 is a flowchart showing the processing routine of the command reception process executed by the host adaptor 110 of a storage system 100 that has received a command. FIG. 14 is a conceptual depiction of a command chain being transmitted to the storage system 100R at a remote site. A storage system control process is a process for transmitting control commands for controlling a storage system (hereinafter termed simply a command) to a storage system targeted for control.

The host computer 200, upon initiation of the storage system process, first acquires the content of the control (Step S11). Control content is acquired, for example, by input of user instructions to the host computer 200. Control content may include, for example, copy pair control to control a copy pair in the storage system 100, or fault notification volume control to control the fault notification volume P0 mentioned previously. Copy pair control may include, for example, a copy pair configuration command to configure a copy pair and initiate the copy process in a storage system 100, a copy pair termination command to delete a previously configured copy pair and terminate the copy process, a copy suspension command to temporarily suspend the copy process for a copy pair that is previously configured and in-process, and a copy resume command to resume the copy process for a copy pair in the suspended state.

Fault notification volume control may include a fault notification volume configuration command to configure a fault notification volume, a fault notification volume delete command to delete a fault notification volume, and a fault notification volume status notification command to notify of status for a fault notification volume.

Regardless of control content, the basic control process flow is the same. In the following description, an instance where, in the storage system 100R, a copy pair configuration command to configure a copy pair composed of a local mirror (LM) wherein volume R2 is the primary volume and volume R2 is the secondary volume, is taken by way of specific example (FIG. 14).

After control content is acquired, the host computer 200 refers to the aforementioned route information 227 and identifies the command communication route (Step S12). In a specific example, the connection route host computer 200—command device P1 of storage system 100P—command device L1 of storage system 100L—command device R1 of storage system 100R is identified as the command communication route. Where the control target is the storage system 100P able to communicate with the host computer 200 (hereinafter termed local control), the command communication route is simply host computer 200—command device P1 of storage system 100P.

After the command communication route is identified, the host computer 200 generates a command recording the control command, on the basis of the acquired control content and the identified command communication route (Step S13). In the case of remote control, as shown conceptually in FIG. 12, the command takes the form of a command chain CC having a structure that links a control content instruction command C1, transmit instruction commands C2 and C3, and a remote instruction command C4. The commands C1-C4 making up the command chain are composed of a header in which a initial destination is recorded, and a body in which are recorded the instruction content and supplemental information needed to execute the instruction content.

In the header, is recorded the initial destination to which the command is initially issued (in the embodiment, the command device P1 of storage system 100P), the recorded initial destination being the same in all commands C1-C4.

The control content instruction command C1 is a command to instruct the control target (in the specific example, the storage system 100R) to execute the control content. In the body of the control content instruction command C1 "configure copy pair" is recorded as the content to instruct, and information defining the copy pair to be configured (hereinafter termed pair defining information), namely, the primary volume, secondary volume, and copy kind, is recorded as supplemental information. Where the copy pair to be configured is a remote copy, path defining information defining the path to be used will be recorded as well.

The transmit instruction commands C2 and C3 are commands instructing the storage system receiving the issued command chain CC to transmit it to another storage system. In the body of the transmit instruction commands C2 and C3 are recorded "transmit" as the content to instruct and, the transmission destination as supplemental information. The transmit instruction commands C2 and C3 are linked in the command chain CC, in a number equivalent to the number of steps transmitted. That is, in the specific example, the command chain CC requires two steps, namely, a step transmitted from the command device P1 of storage system 100P to the command device L1 of storage system 100L (hereinafter "transmission 1." See FIG. 14) and a step transmitted from the command device L1 of storage system 100L to the command device R1 of storage system 100R (hereinafter "transmission 2." See FIG. 14), so the two instruction commands C2 (which instructs transmission 1) and C3 (which instructs transmission 2) are linked in the command chain CC. The remote instruction command C4 is a command apprising the storage system 100P able to communicate with the host computer 200 of the fact that the command chain CC is a command chain for remote control use. In the body of the remote instruction command C4 are recorded "remote" as the content to instruct, and, as supplemental information, the destination to be notified of remote control (in the specific example, the command device R1 of storage system 100R).

In the case of local control, on the other hand, since the transmit instruction commands C2 and C3 and remote instruction command C4 are not necessary, the command will have a structure consisting of a control content instruction command C1 only.

After the command is generated, the host computer 200 transmits the generated command to the storage system 100P (Step S14), and the routine terminates.

The following description of the command (control command) reception process executed in the host adaptor 110 of the storage system 100 receiving the aforementioned command makes reference to FIG. 13. The command reception process is carried out in basically the same way in all of the storage systems 100, and accordingly will be described generally without distinguishing among sites. However, parts that do differ by storage system at different sites will be described on a case-by-case basis.

When a host adaptor 110 receives a command, a determination is made as to whether the command is directed to its local storage system (Step S21). In the event that the acquired command is a command chain composed of even one linked remote instruction command C4 or transmit instruction command C2, C3, it determines that the command is not directed to the local storage system (Step S21: NO). Thereupon, the host adaptor 110 acquires the transmission destination for the command, recorded in the transmit instruction command that makes up the command chain (Step S22).

Upon acquiring the transmission destination, the host adaptor 110 transmits the command to the acquired transmission destination (Step S23). For example, the host adaptor 110P of the storage system 100P having acquired the command chain CC depicted in FIG. 12 will transmit the command to the command device L1 of the storage system 100L. During this time, the host adaptor 110 strips the acquired transmit instruction command from the command chain for transmission to the transmission destination. The host adaptor 110P of the storage system 100P able to communicate with the host computer 200 also strips the remote instruction command C4 from the command chain.

On the other hand, in the event that the acquired command is a control content instruction command C1 only without even one linked transmit instruction command C2, C3 or remote instruction command C4, the host adaptor 110 determines that the command is directed to the local storage system (Step S21: YES). Thereupon, the host adaptor 110, in accordance with the control content recorded in the control content instruction command C1, executes the instructed control command (Step S24). The host adaptor 110 then generates a control command execution result, and transmits it as a response to the command (hereinafter command response) to the command sender.

Referring now to FIG. 14, the result of executing the aforementioned command (control command) reception process in each of the storage systems 100P, 100L, 100R that receive the command chain CC shown in FIG. 12 will be described. As shown in FIG. 14, the host adaptor 110P of the storage system 100P which has acquired the command chain CC shown in FIG. 12 has determined that the acquired command chain CC's control target is not the storage system 100P itself (Step S21: NO), since a remote instruction command C4 and transmit instruction command C2, C3 are linked to the acquired command chain CC.

And the host adaptor 110P recognize, as the transmission destination, the command device L1 of the storage system 100L recorded in the transmit instruction command C3 (Step S22). The host adaptor 110P then transmits the command, from which the remote instruction command C4 and transmit instruction command C3 have been stripped, to the storage system 100L (Step S23).

Since a transmit instruction command C2 is linked to the received command, the host adaptor 110L of the storage system 100L that has received the command transmitted by the storage system 110P determines that the command is not directed to its local storage system (Step S21: NO). The host adaptor 110L acquires the command device R1 of the storage system 100R recorded in the transmit instruction command C2 as the transmission destination (Step S22). The host adaptor 110L then transmits the command, from which the transmit instruction command C2 has been stripped, to the storage system 100L (Step S23).

Since the received command consists of a control content instruction command C1 only, the host adaptor 110R of the storage system 100R that has received the command transmitted from the storage system 110L determines that the command is directed to its local storage system (Step S21: YES). The host adaptor 110R, in accordance with the control content recorded in the control content instruction command C1, configures a local mirror copy pair composed of volume R2 and volume R3 (Step S24). The host adaptor 110R, in the event that the copy pair has been successfully configured, generates a command response to the effect that it was successful, or in the event of fault to the effect that it failed, and transmits this to the command sender, i.e. the storage system 100L (Step S25).

As shown in FIG. 14, the command response is transmitted back over the command communication route over which the command was originally transmitted, until ultimately reaching the host computer 200. Transmission of the command response is executed by means of the host adaptors 110 of the storage systems receiving a command temporarily storing the information to identify command sender in the shared memory 140 until the command response is transmitted.

Figure 15:
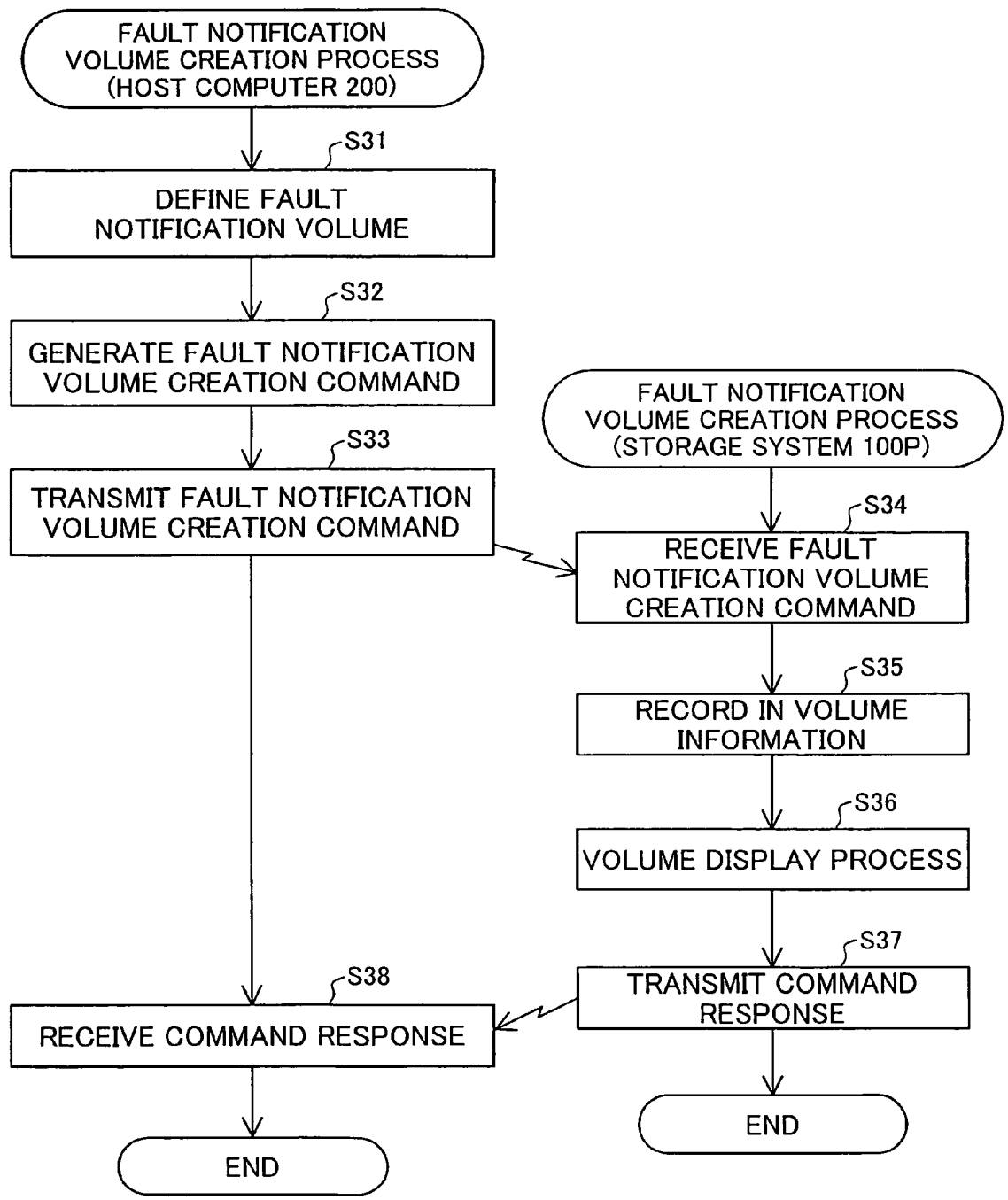
FIG. 15 is a flowchart showing the processing routine of the fault notification volume creation process.

A-2-2. Fault Notification Volume Creation Process:

By means of the storage system control process (FIG. 11) and command reception process (see FIG. 13) described above, various control processes, including the aforementioned copy pair control mentioned above, can be executed. Among these control processes, the description now turns to the process for creating a fault notification volume for use in fault notification, described later (hereinafter termed fault notification volume creation process), making reference to FIG. 15 and FIGS. 16A-16D. FIG. 15 is a flowchart showing the processing routine of the fault notification volume creation process. FIGS. 16A-16D are illustrations showing command and a command response used in the fault notification volume creation process. In FIG. 15, for convenience in description, processes executed in the host computer 200 and processes executed in the storage system 100P are shown parallel.

When the fault notification volume creation process is initiated, the host computer 200 defined a fault notification volume (Step S31). As noted previously, the fault notification volume is a virtual volume, but like a normal volume, is assigned a volume identifier. As shown in FIG. 6, in the embodiment, volume #0 is assigned as the identifier of the fault notification volume. Since the fault notification volume is generated only by the storage system able to directly communicate with the host computer 200, in the embodiment, it is generated by storage system 100P. Accordingly, in the embodiment, the fault notification volume is defined as "volume #0 of storage system 100P" (denoted as fault notification volume P0). Since the host computer 200 will use it in the status notification process etc. described later, it records the fault notification volume definition. For example, it may be recorded in the fault management table 300 mentioned previously.

The host computer 200 creates a command having, as content to instruct, creation of the defined fault notification volume P0 (hereinafter termed fault notification volume generation command) (Step S32). FIG. 16A shows an example of a fault notification volume creation command. Since this command represents local control, it consists only of a control content instruction command C1, without any transmit instruction command etc. linked to it. The host computer 200 transmits the fault notification volume creation command created thusly to the storage system 100P (Step S33).

When the host adaptor 110P of the storage system 100P receives the fault notification volume creation command (Step S34), the host adaptor 110P analyzes the command and acquires the definition information for the fault notification volume, and records regarding the fault notification volume in the volume information 141P of the shared memory 140P (Step S35). For example, as in the uppermost row of the volume information shown in FIG. 5A, a volume number of "0" and a volume status of "for fault notification" are recorded. The fault notification volume is a virtual volume, and is a special volume that is not part of a copy pair, and thus no other items are recorded for it, nor is any physical address assigned in the HDD 180.

The host adaptor 110P executes a volume display process to enable the host computer 200 to recognize it in the same way as an ordinary volume (Step S36). Specifically, the host adaptor 110P associates the fault notification volume with the I/O port of the I/O unit 113 connected to the host computer 200, to enable the host computer 200 to access the fault notification volume. For example, where the connection between the host computer 200 and the I/O port is a SCSI connection, a procedure to associate the LUN (Logical Unit Number) of the fault notification volume with the I/O port would be appropriate. Where the connection between the host computer 200 and the I/O port is a Fiber Channel connection, a procedure to associate the fault notification volume device with the I/O port (channel device) would be appropriate.

The host adaptor 110P transmits the results (normal termination, error, etc.) of the aforementioned process (Steps S35-S36) to the host computer 200 as the command response R1 (Step S37). An example of the command response R1 is shown in FIG. 16B. The host computer 200 receives the command response R1 from the storage system 100P, and terminates the routine (Step S38).

In the host computer 200, it is also possible to create a fault notification volume creation command C1 that does not contain information defining the volume (see FIG. 16C), without executing definition of the fault notification volume (Step S31). In this case, the host adaptor 110P of the storage system 100P that has received the fault notification volume creation command defines the fault notification volume, and transmits a command response R1 including information that defines the volume (see FIG. 16D) to the host computer 200.

The host computer 200 can delete the fault notification volume once created, by transmitting a fault notification volume delete command. In this case, the host adaptor 110P of the storage system 100P that has received the fault notification volume delete command invalidates the aforementioned process (deletes the fault notification volume record from the volume information 141P, and cancels the association of the fault notification volume with the I/O port).

A-2-3. Fault Detection Process

Figure 17:
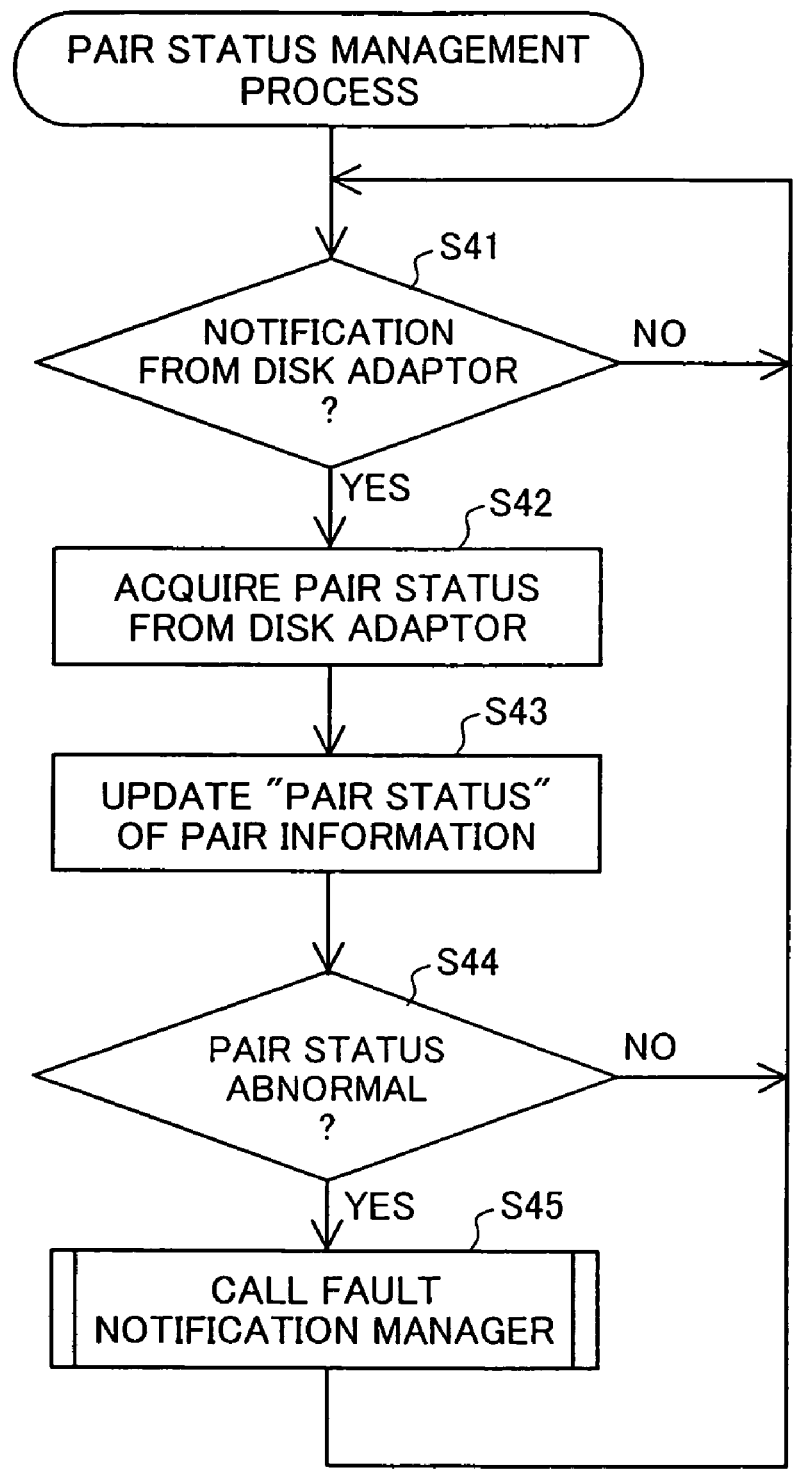
FIG. 17 is a flowchart showing the processing routine of the pair status management process.
Figure 18:
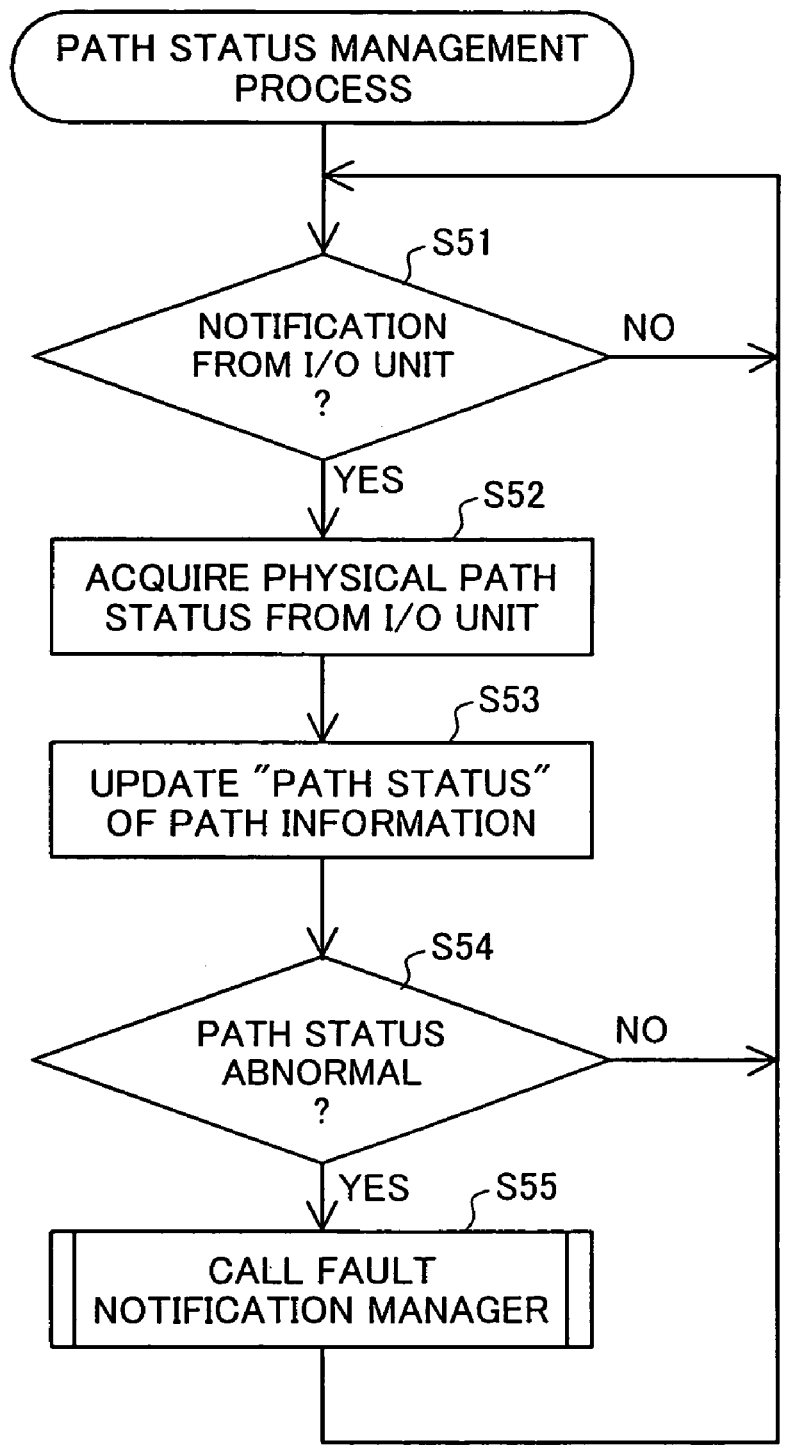
FIG. 18 is a flowchart showing the processing routine of the path status management process.

Next, the fault detection process in the storage systems 100P, 100L, 100R will be described making reference to FIG. 17 and FIG. 18. FIG. 17 is a flowchart showing the processing routine of the pair status management process. FIG. 18 is a flowchart showing the processing routine of the path status management process.

The fault detection process is a process executed by the host adaptor 110 (CPU 111) running the fault management manager 60, which is a program provided in the memory 112. The fault detection process is a process that involves monitoring the status of the storage systems, and in the event that a fault occurs in a storage system, detecting the fault and calling the fault notification manager 50. The fault detection process involves a pair status management process that manages copy pair status using the pair information 142, and a path status management process that manages the aforementioned path status using the path information 143; these two process are executed in parallel. The fault detection process is carried out in the same manner in all of the storage systems 100P, 100L, 100R, and accordingly will be described generally without distinguishing among sites. During the interval that the storage systems are operating, the fault management manager 60 basically runs constantly, and the fault detection process is executed constantly.

First, the pair status management process shown in FIG. 17 will be described. When the process is executed, the host adaptor 110 constantly monitors whether there is a copy pair status notification from the disk adaptor 150 in the storage system 100 (Step S41). As noted earlier, the disk adaptor 150 controls writing of data to the HDD 180 and reading of data from the HDD 180, and executes the processes of total copying and differential copying described earlier. Thus, for example, in the event that the HDD 180 corresponding to a volume making up a copy pair is abnormal and may not be read from, the disk adaptor 150 will initially recognize the change in status occurring in the copy pair. In the event of a change in copy pair status, the disk adaptor 150 writes the status information, together with information identifying the copy pair, to a predetermined area in the shared memory 140, in order to notify the host adaptor 110 of the status. The host adaptor 110 then monitors the predetermined area of the shared memory 140 in order to recognize whether there is a status notification from the disk adaptor 150. That is, the host adaptor 110, in the event that some kind of fault has occurred in a copy pair, may detect the fault through the agency of this status notification.

In the event that there is a status notification from the disk adaptor 150 (Step S41: YES), the host adaptor 110 acquires the copy pair status notification from the disk adaptor 150 recorded in the shared memory 140 (Step S42).

The host adaptor 110, on the basis of the acquired copy pair status notification, updates the "pair status" in the pair information 142 stored in the shared memory 140 (see FIG. 5B) (Step S43).

The host adaptor 110 then determines whether the acquired copy pair status notification indicates abnormality (Step S44). In the event that pair status is abnormal (Step S44: YES), the host adaptor 110 calls the aforementioned fault management manager 50 (Step S45). In the event that pair status is not abnormal (Step S44: NO), the host adaptor 110 returns to Step S41 and resumes a state of monitoring whether there is a copy pair status notification from the disk adaptor 150.

Next, the path status management process shown in FIG. 18 will be described. When the process is executed, the host adaptor 110 constantly monitors whether there is a physical path status notification from the I/O unit 113 to which is connected a data line 30 (physical path) connecting to the outside (i.e. the host computer 200 or another storage system (herein referred to as an external storage system)) (Step S51). A physical path status notification is made by the I/O unit 113 in the event that, for example, a data line 30 (physical path) has experienced the timeout condition mentioned previously. In the event that there has been a physical path status notification (Step S51: YES), the host adaptor 110 acquires the status of the reported data line 30 (physical path) (Step S52). That is, the host adaptor 110, in the event of some kind of fault on a data line 30 (physical path), detects the fault through the agency of a physical path status notification.

On the basis of the acquired physical path status, the host adaptor 110 updates the "path status" of the logical path corresponding to the data line 30 (physical path) in the path information 143 (FIG. 5C).

The host adaptor 110 then determines whether the acquired data line 30 (physical path) status reports that path status of the corresponding logical path is abnormal (Step S54). In the event that path status is abnormal (Step S54: YES), the host adaptor 110 calls the aforementioned fault management manager 50 (Step S55). In the event that path status is not abnormal (Step S54: NO), the host adaptor 110 returns to Step S51 and resumes a state of monitoring whether there is a physical path status notification from the I/O unit 113.

In the event that the fault management manager 50 is called (Step S45 or S55), the fault notification-related processes described in detail later will be carried out.

A-2-4. Fault Notification-related Process

Figure 19:
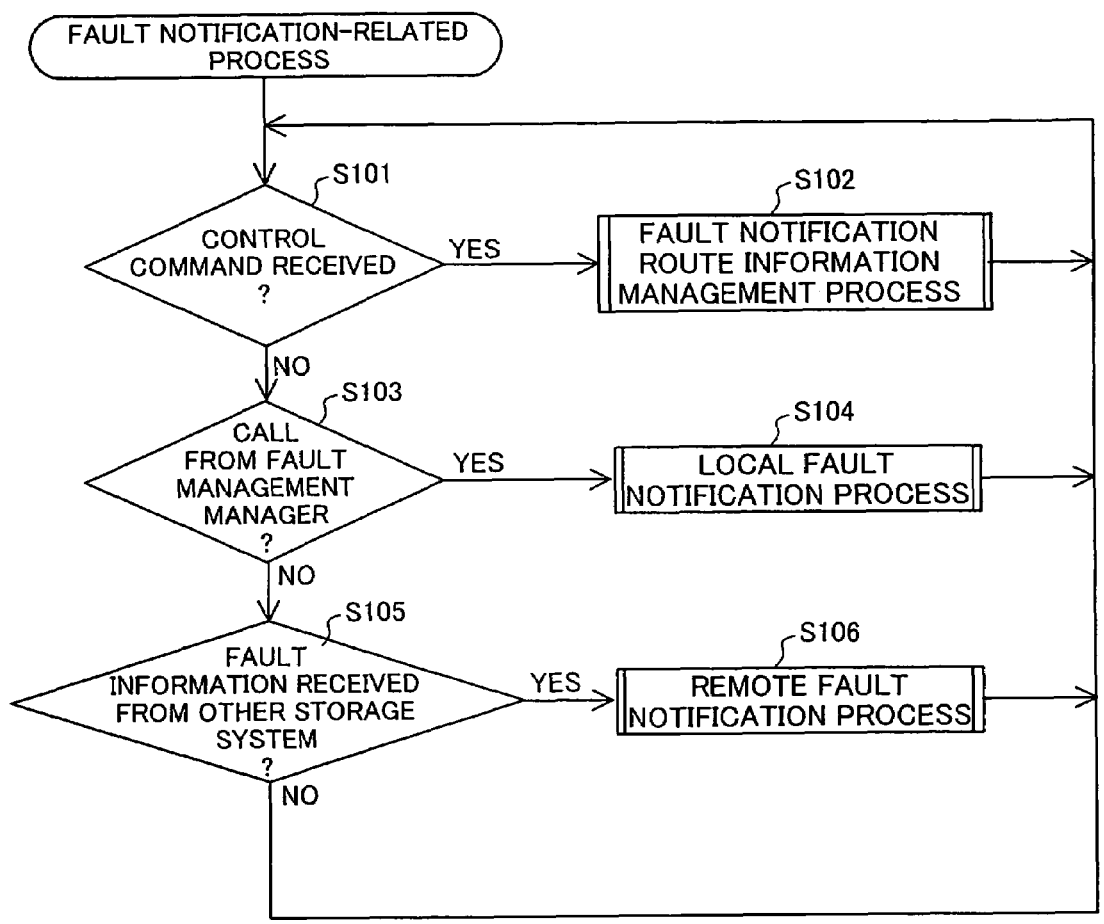
FIG. 19 is a flowchart showing the processing routine of the fault notification-related process.
Figure 20:
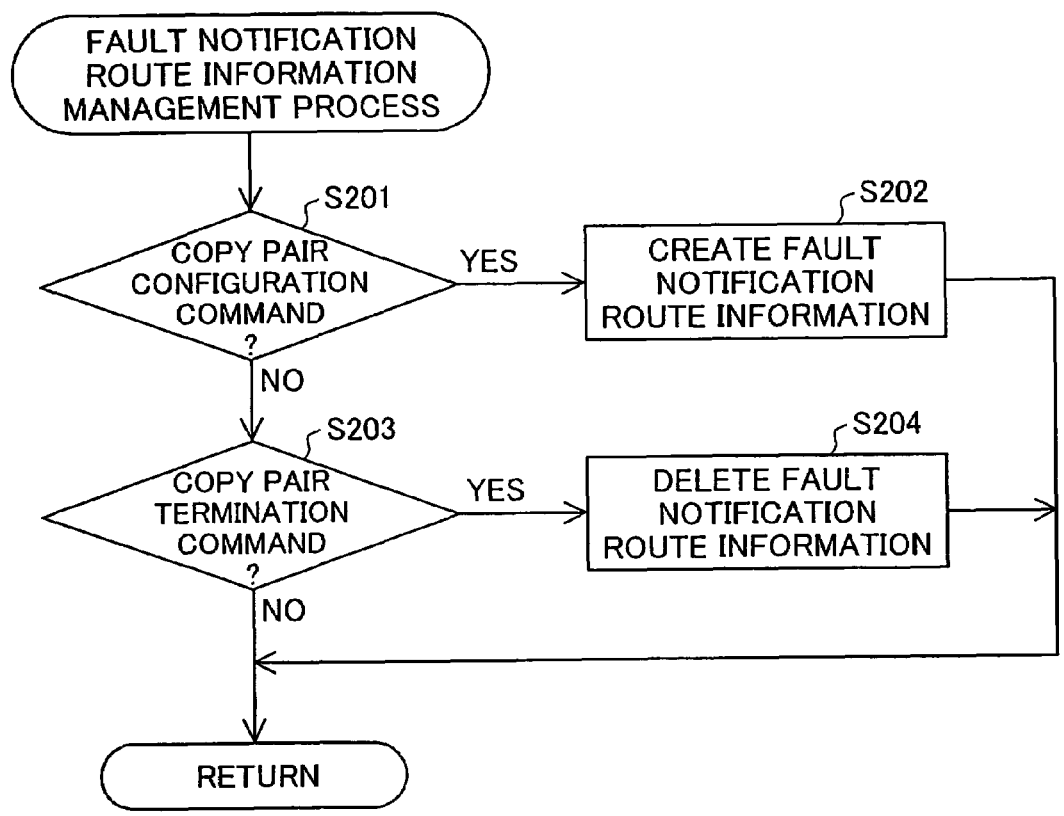
FIG. 20 is a flowchart showing the processing routine of the fault notification route information management process.
Figure 21:
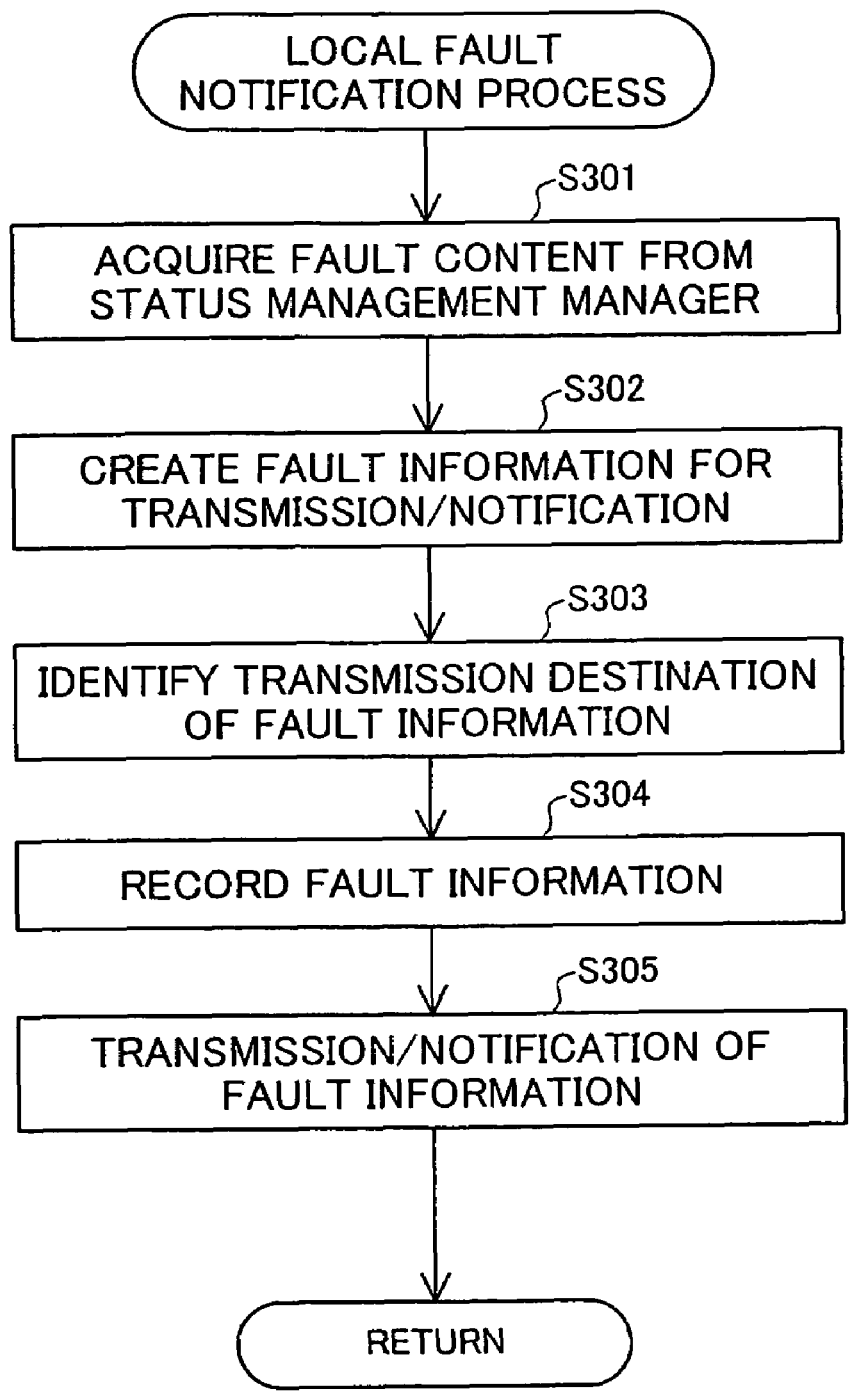
FIG. 21 is a flowchart showing the processing routine of a local fault notification process.
Figure 23:
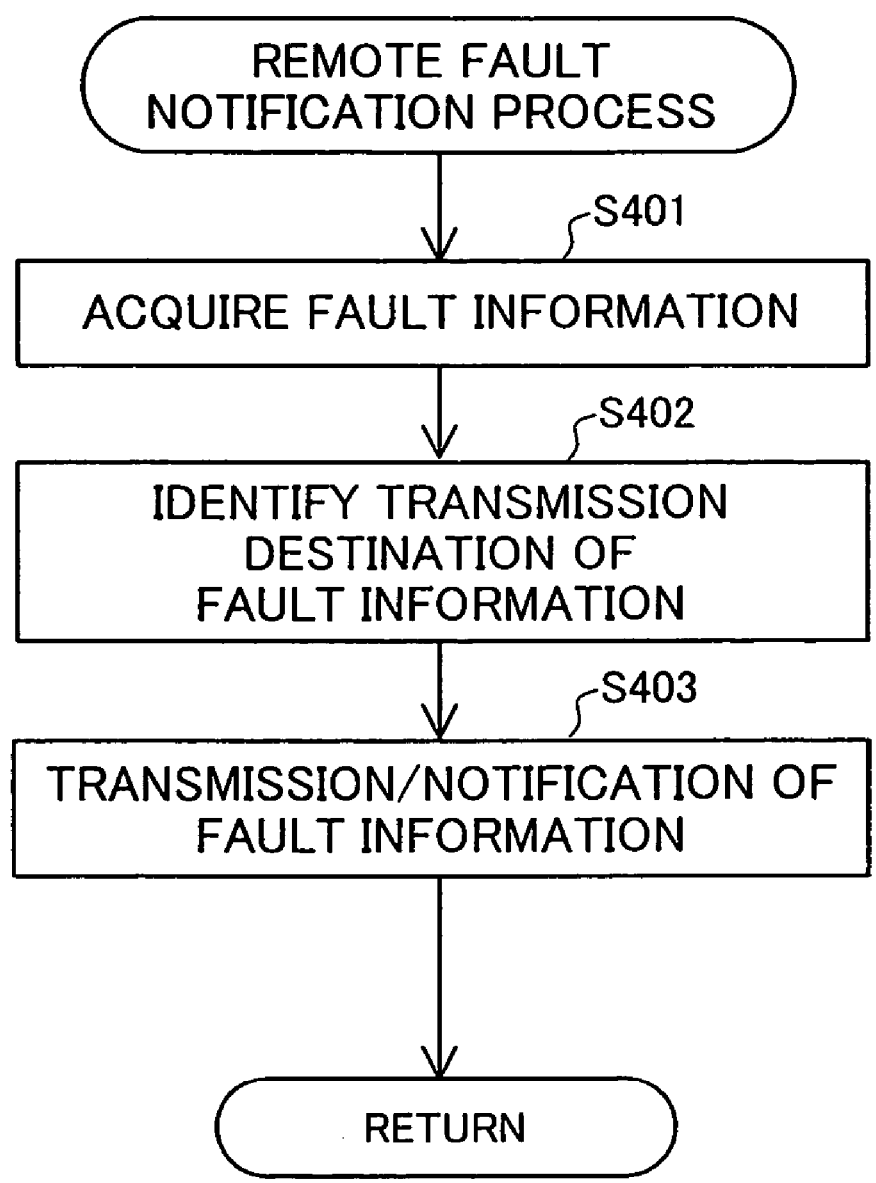
FIG. 23 is a flowchart showing the processing routine of a remote fault notification process.
Figure 24:
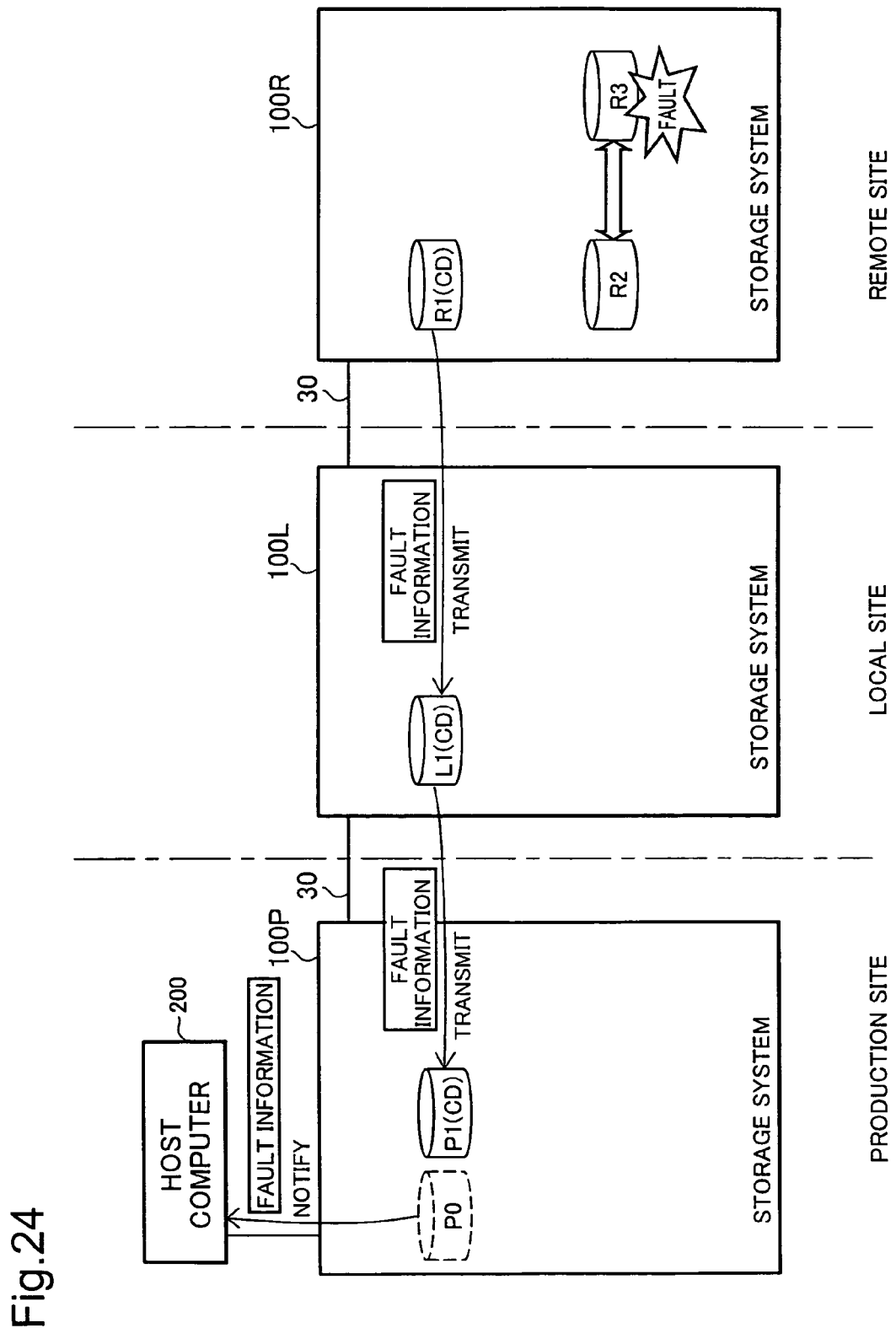
FIG. 24 is a conceptual depiction of notification of the host computer of fault information in a storage system at a remote site, resulting from execution of fault notification-related processes in storage systems.

The fault notification-related process in the storage systems 100P, 100L, 100R will now be described with reference to FIGS. 19-24. FIG. 19 is a flowchart showing the processing routine of the fault notification-related process. FIG. 20 is a flowchart showing the processing routine of the fault notification route information management process. FIG. 21 is a flowchart showing the processing routine of a local fault notification process. FIGS. 22A-22B are illustrations showing fault information transmitted/notified by a storage system. FIG. 23 is a flowchart showing the processing routine of a remote fault notification process. FIG. 24 is a conceptual depiction of notification to the host computer 200 of fault information in a storage system 100R at a remote site, resulting from execution of fault notification-related processes in storage systems 100P, 100L, 100R.

The fault notification-related process is basically carried out in the same way in all of the storage systems, and will therefore be discussed generally without distinguishing among systems. However, parts that do vary by storage system 100 will be discussed on a case-by-case basis. The fault notification-related process is a process for notifying the host computer 200 of fault occurring in a copy pair in a storage system 100. The fault notification-related process is executed by means of the host adaptor 110 (CPU 111) executing the fault management manager 50, which is a program stored in the memory 112. During the interval that the storage systems are operating, the fault management manager 50 basically runs constantly, and the fault notification-related process is executed constantly.

When a command (control command) is received (Step S101: YES), the host adaptor 110, in addition to the command reception process described previously (FIG. 13), executes the fault notification route information management process (Step S102) as a process executed by the fault management manager 50. The fault notification route information management process is a process that manages fault notification route information recorded in the fault notification table 144 mentioned earlier.

When the fault notification route information management process begins, the host adaptor 110 determines whether the received command is a copy pair configuration command, mentioned previously (Step S201). Where the received command is a copy pair configuration command (Step S201: YES), the host adaptor 110 creates fault notification route information relating to the copy pair being configured by the received command, and records the created fault notification information in the fault notification table 144 stored in the shared memory 140 (Step S202). The content stored as the fault notification route information includes the fault information destination and pair defining information described with reference to FIGS. 7A-7C.

In the storage system 100P, the host computer 200 which is the sender of the command is recorded as the fault information destination. In the storage system 100L or storage system 100R, as the fault information destination, there is recorded one storage system 100 that is the sender of the received command, the one storage system being able to directly communicate with the storage system that has received the command (hereinafter the one storage system is referred to as the transmitting storage system). In the embodiment, the command device of the transmitting storage system (e.g. P1 or L1) is recorded. In the fault notification table 144 in either of the storage systems, the pair defining information included in the command C1 (FIG. 12) is recorded in association with the fault information destination.

As a specific example, an instance in which the copy pair configuration command shown in FIG. 12 (a command to configure a local mirror copy pair having volume R2 as the primary volume and volume R3 as the secondary volume in storage system 100R) has been received will be described. In storage system 100P, the information of #8 shown hatched in FIG. 7A is recorded in the fault notification table 144P. That is, the host computer 200, which is the sender of the transmitted command, is recorded in the storage system 100P; as pair defining information, there is recorded the pair defining information included in the command (copy kind=local mirror (LM), primary volume=volume R2, secondary volume=volume R3). In storage system 100L, the information of #5 shown hatched in FIG. 7B is recorded in the fault notification table 144L. That is, the command device P1 of the storage system 100P, which is the sender of the transmitted command, is recorded in the storage system 100L, and as pair defining information, there is similarly recorded the pair defining information included in the command. In storage system 100R, the information of #1 shown hatched in FIG. 7C is recorded in the fault notification table 144R. That is, the command device L1 of the storage system 100L, which is the sender of the transmitted command, is recorded in the storage system 100R, and as pair defining information, there is similarly recorded the pair defining information included in the command.

The fault notification route information management process is executed by the storage systems 100P, 100L, 100R which have received the command on the command communication route. Accordingly, at the point in time that the command shown in FIG. 12 is transmitted to the storage system 100R, in the storage systems 100P, 100L, 100R, the fault notification route information indicated by the aforementioned hatching will be recorded in the respective fault notification tables 144P, 144L, 144R.

Returning to FIG. 20, after the host adaptor 110 has created and recorded the fault notification route information (Step S202), the fault notification route information management process terminates, and the system returns to the fault notification-related process of FIG. 19.

In the event that the received command is not a copy pair configuration command (Step S201: NO), the host adaptor 110 determines whether the received command is a copy pair termination command, mentioned earlier (Step S203). In the event that the received command is a copy pair termination command (Step S203: YES), the host adaptor 110 deletes from the fault notification table 144 the fault notification route information relating to the copy pair whose copy process is terminated by the command (Step S204). Specifically, the host adaptor 110 acquires the copy defining information included in the command, and deletes a fault notification route information from the fault notification table 144, wherein the fault notification route information includes a pair defining information that matches the acquired pair defining information.

The fault notification route information management process is executed by means of the storage systems 100P, 100R, 100L that receive the command over the command transmission route. Accordingly, for example, at the point in time that the command to terminate the copy pair configured by means of the command shown in FIG. 12 is transmitted to the storage system 100R, in the storage systems 100P, 100L, 100R, the fault notification route information indicated by the aforementioned hatching will be deleted from the respective fault notification tables 144P, 144L, 144R.

After the host adaptor 110 has deleted the fault notification route information (Step S203), the fault notification route information management process terminates, and the system returns to the fault notification-related process of FIG. 19. In the event that the received command is a command other than a copy pair configuration command or a copy pair termination command (e.g. a copy suspension command or a copy resume command), the host adaptor 110 does nothing.

In the event that the host adaptor 110 has not received any command (Step S101: NO), a determination is made as to whether the fault notification manager 50 has been called (FIG. 17: Step S45 or FIG. 18: Step S55) in the aforementioned processes executed by the fault management manager 60 (the pair status management process and the path status management process) (Step S103). In the event of these invocations (Step S103: YES), the host adaptor 110 executes a local fault notification process (see FIG. 21) to report a fault that has occurred locally in the storage system 100.

When the host adaptor 110 initiates the local fault notification process, the host adaptor 110 acquires the fault content from the fault notification manager 50 (Step S301). The acquired fault content may include, for example, in the case of abnormal pair status, pair defining information for the abnormal copy pair, and information relating to the pair abnormality. Information relating to the pair abnormality may include, for example, in the case of a local mirror, information indicating whether the abnormality has occurred in the primary volume or the secondary volume. In the case of a remote copy, information indicating whether the abnormality has occurred in the primary volume will be included. In the case of a remote copy, since the secondary volume is present in a different storage system, it is not possible to directly recognize whether the abnormality has occurred in the secondary volume, so this information will not be included. In the case of abnormal path status, path defining information defining the abnormal path and information relating to the path abnormality will be included. Since the data line 30 (physical path) corresponding to the path has a condition of a line break or a communications overload, the information relating to the path abnormality will include information indicating that when data is transmitted over the path, data transmission is not completed even after a predetermined time interval has elapsed (a so-called "timeout").

When the host adaptor 110 acquires the fault content, it creates fault information for transmission/notification purposes (Step S302). As shown in FIG. 22, the fault information includes information identifying the location at which the fault occurred (volume or path) (hereinafter termed fault location information) and fault type (volume fault, path timeout etc.). FIG. 22A shows an example of fault information in the case of a volume fault, and FIG. 22B shows an example of fault information in the case of a path fault.

In the event that acquired fault content indicates a local mirror fault or path fault, the host adaptor 110 may create fault information from the acquired fault content. On the other hand, in the event of a remote copy fault, in order to identify the fault location, the host adaptor 110 refers to the pair information 142 and the path information 143 to identify the path of the copy pair of the remote copy and acquires the status of the identified path from the path information 143. In the event that in the remote copy copy pair the primary volume is abnormal, the host adaptor 110 then determines that the fault is a volume fault of the primary volume; in the event that the path is abnormal, it determines that the fault is a path fault; or in the event that neither the primary volume nor the path is abnormal, it determines that the fault is a volume fault of the secondary volume (volume of another storage system), and creates corresponding fault information. This is because, as noted, a volume fault in another storage system may not be recognized directly.

When fault information is created, the host adaptor 110 refers to the fault notification table 144 to identify a destination for transmission/notification (Step S303). Specifically, the host adaptor 110 refers to fault location information included in the created fault information, to pair defining information included in the fault notification table 144, and to the path information 143, and searches the fault notification table 144 for fault notification route information corresponding to the copy pair included in the fault location pertaining to the fault information therein. For example, in the case of the fault information depicted in FIG. 22A, the host adaptor 110R that created the fault information will search the fault notification table 144R shown in FIG. 7C for fault notification route information #1, and will identify the command device L1 of the storage system 100L as the destination for transmission of this fault information. In the case of the fault information depicted in FIG. 22B, the host adaptor 110L that created the fault information will search the fault notification table 144L shown in FIG. 7B for fault notification route information #3, and will identify the command device P1 of the storage system 100P as the destination for transmission of this fault information. In this way, in the case of a storage system 100L or storage system 100R that is not connected to the host computer 200, another storage system able to directly communicate with that storage system will be identified. On the other hand, in the case of a storage system 100P that is able to directly communicate with the host computer 200, the host computer 200 will be identified (see FIG. 7A).

Next, the host adaptor 110 records the content of the fault information created in Step S302 as a fault record (Step S304). For example, a fault record log may be created in the command device to record a fault record. The host adaptor 110 then transmits/notifies the destination identified in Step S303 of the fault information it created in Step S302 (Step S305), and returns to the fault notification-related process shown in FIG. 19. For example, as shown in FIGS. 22A-22B the host adaptor 110 appends the identified destination (L1 or P1) as a header to the fault information, and transmits this to the destination.

In the event that there is no call from the fault management manager 60 (Step S103: NO), the host adaptor 110 determines whether fault information has been received from another storage system able to directly communicate with that storage system (Step S105). Taking the example of storage system 100L, if fault information is transmitted from storage system 100R to storage system 100L (see Step S305 described above), the host adaptor 120L of the storage system 100L connected to the storage system 100R stores the transmitted fault information, together with a flag indicating that fault information was sent, in the shared memory 140L. The host adaptor 110L examines the shared memory 140L, and in the event that The host adaptor 110L encounters this flag, recognizes that fault information was received from another storage system. In the event that fault information is received from another storage system (Step 105: YES), the host adaptor 110 executes the remote fault notification process (Step S106).

When the remote fault notification process (FIG. 23) is initiated, first, the fault information transmitted from the other storage system is acquired from the shared memory 140 (Step S401). The acquired fault information is fault information created and sent along by a local fault information process, described earlier, executed in another storage system, and is depicted in FIG. 22 referred to previously.

Once fault information is acquired, the host adaptor 110 refers to the fault notification table 144 and identifies the destination for the acquired fault information (Step S402). Specifically, as in the process in Step S303 of the local fault notification process described previously, the host adaptor 110 refers to fault location information included in the acquired fault information, to pair defining information included in the fault notification table 144, and to the path information 143, and searches the fault notification table 144 for fault notification route information corresponding to the copy pair included in the fault location pertaining to the acquired fault information therein. For example, in the case of the fault information depicted in FIG. 22A, the host adaptor 110L of the storage system 100L that acquired the fault information transmitted from storage system 100R will search the fault notification table 144L shown in FIG. 7B for fault notification route information #5, and will identify the command device P1 of the storage system 100P as the destination for transmission of this fault information. The host adaptor 110P of the storage system 100P that acquired the fault information transmitted from storage system 100L will search the fault notification table 144P shown in FIG. 7A for fault notification route information #8, and will identify the host computer 200 as the destination for transmission of this fault information. In this way, as in the local fault notification process, in the case of a storage system 100L or storage system 100R that is not connected to the host computer 200, another storage system able to directly communicate with that storage system will be identified. On the other hand, in the case of a storage system 100P that is able to communicate with the host computer 200, the host computer 200 will be identified (see FIG. 7A).

Next, the host adaptor 110 transmission/notification of the content of the fault information acquired in Step S401 to the destination identified in Step S402 (Step S403), and returns to the fault notification-related process shown in FIG. 19. For example, the host adaptor 110 updates the destination appended as a header to the acquired fault information, to the destination identified in Step S402, and transmits the acquired information to the updated destination.

In simple terms, the fault notification-related process described above is one whereby the host adaptor 110 of each storage system 100P, 100L, 100R constantly monitors for the occurrence of a fault in the storage system per se (existence of a call from the fault management manager 60) and for fault information transmitted from other storage systems, and in the event that a command is received, executes recording or deletion of fault notification route information in accordance with the content of the command (fault notification route information management process); in the event that there is a fault in the storage system itself, transmits or reports fault information (local fault notification process); or in the event that fault information is transmitted from another storage system, transmits or reports the fault information (remote fault notification process).

Following is a brief description, with reference to FIG. 24, of the host computer 200 being notified of fault information in the storage system 100R at a remote site, as a result of execution of the fault notification-related process in the storage systems 100P, 100L, 100R. Let it be assumed that, as shown in FIG. 24, a volume fault has occurred in volume R3 which makes up a local mirror in storage system 100R. Thereupon, the host adaptor 110R of the storage system 100R executes the local fault notification process described earlier (see FIG. 21) and transmits the fault information to storage system 100L (specifically the command device L1). Then, the host adaptor 110L of the storage system 100L which has received the fault information executes the remote fault notification process (see FIG. 23) and transmits the transmitted fault information on to storage system 100P (specifically the command device P1). Then, the host adaptor 110P of the storage system 100P which has received the fault information executes the remote fault notification process (see FIG. 23) and notifies the host computer 200 of the transmitted fault information.

Following is a more detailed description of notification of fault information to the host computer 200 by the storage system 100P able to directly communicate with the host computer 200. Where the host computer 200 runs a generally available OS (e.g. Windows™, Unix™), the host computer 200 runs the storage control software on the OS, with host computer 200 input and output controlled by the OS. Accordingly, in order to be notified of fault information from the storage system 100P, means for notification of fault information must be provided in a form supported (recognized) by the OS of the host computer 200. Typically, an OS only recognizes devices that are connected directly to the computer 200 on which the OS is installed (in the embodiment, storage system 100P), and supports input of fault information of devices that are directly connected. On the other hand, the OS may not recognize devices that are not connected directly (in the embodiment, storage system 100L and storage system 100R), and does not support input of fault information of devices that are not directly connected. In this case, for both fault information of the storage system 100P itself and fault information transmitted from other storage system, the host adaptor 110P of storage system 100P will notify the host computer 200 as if the fault information were for the storage system 100P itself. In the embodiment, the host adaptor 110P of storage system 100P notifies the host computer 200 of fault information in the form of a fault of the fault notification volume P0. In an alternative embodiment, the host adaptor 110P could instead notify the host computer 200 of fault information in the form of a fault of the command device P1 of storage system 100P.

In some instances direct notification of fault information (fault information including specific content of the fault) is possible in a form supported by the OS of the host computer 200, whereas in others, even if notification that a fault has occurred is possible, notification of fault information including specific content of the fault etc. is not possible. In the former case, the host computer 200 may be notified with fault information in which the content of fault information transmitted from another storage system has been recorded as-is (hereinafter termed direct notification format). In the latter case, storage system 100P records fault information including specific content of the fault to the fault notification table 145P, and only notifies the host computer 200 that a fault has occurred. In this case, a process whereby the host computer 200 issues a query regarding the content of the fault and is notified of the content of the fault by way of a response to the query by storage system 100P will be required (hereinafter this notification format is termed the two-stage notification format).

A-2-5. Process in Host Computer 200 Receiving Fault Notification

Figure 25:
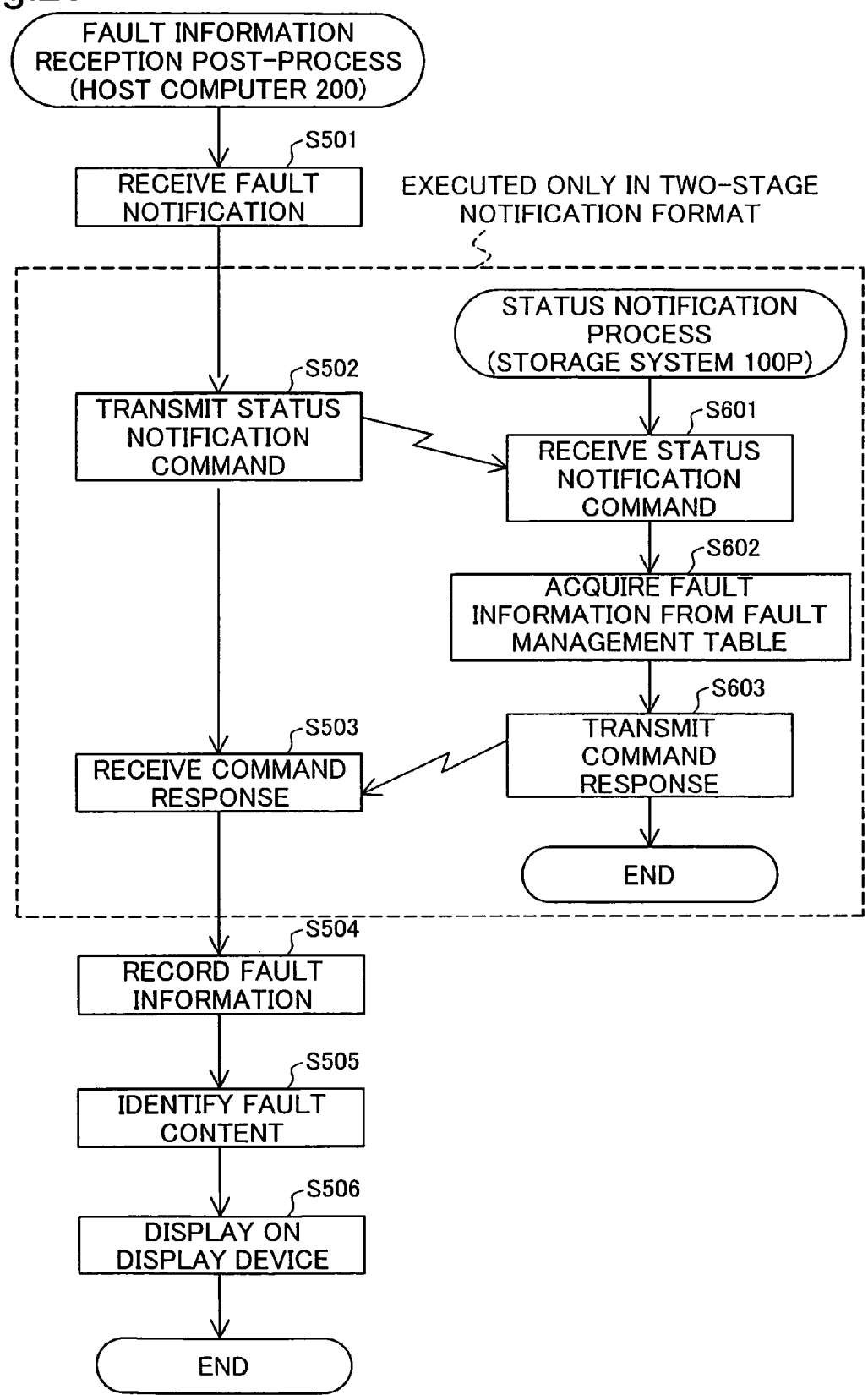
FIG. 25 is a flowchart showing the processing routine of the fault information reception post-process.
Figure 27:
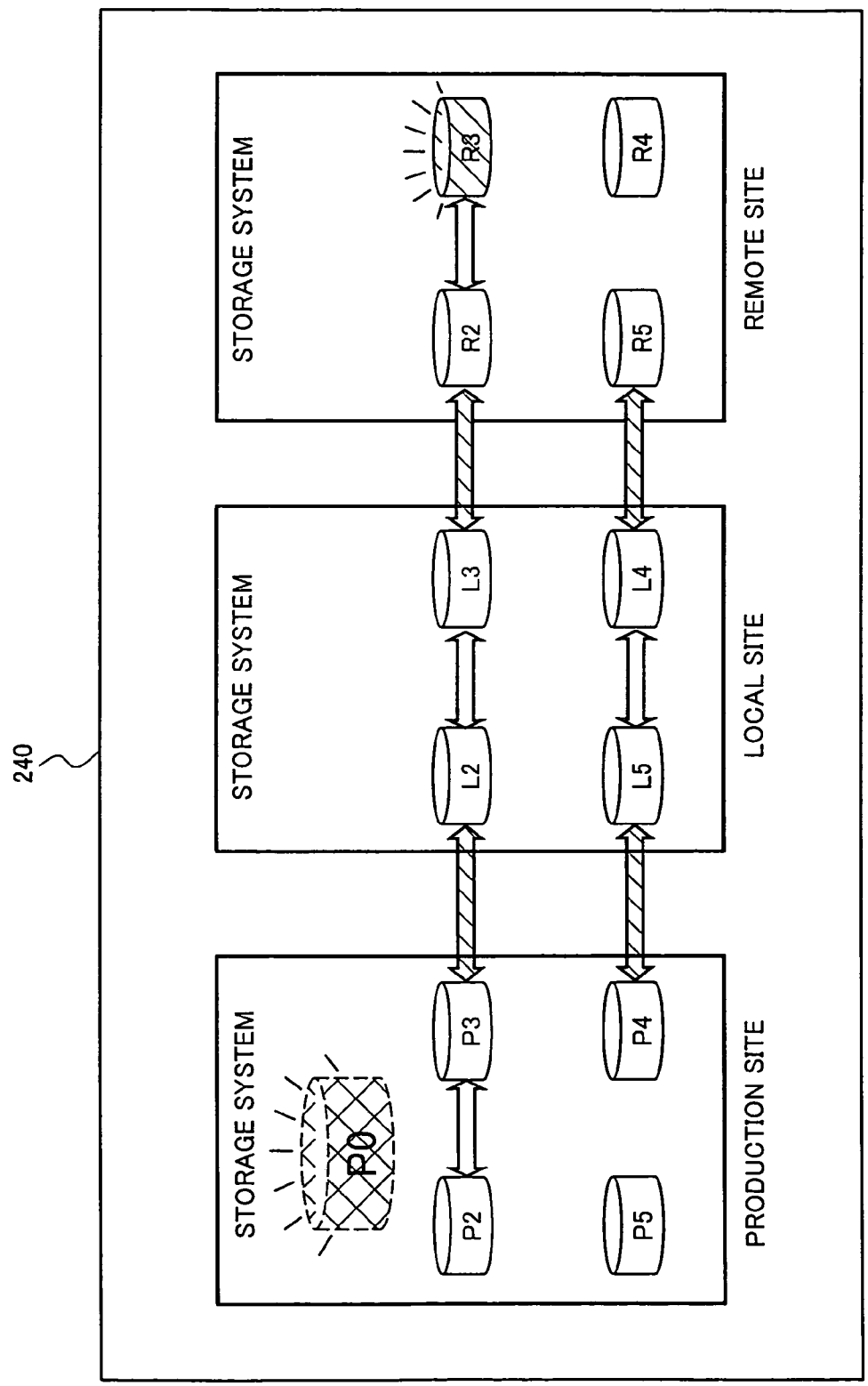
FIG. 27 is an illustration showing an example of a graphic displayed on the display device of the host computer.

The following description of the process in the host computer 200 which has received fault information notified by storage system 100P (hereinafter fault information reception post-process) makes reference to FIGS. 25-27. FIG. 25 is a flowchart showing the processing routine of the fault information reception post-process executed by the host computer 200. For convenience in description, in FIG. 25, the processing routine of the status notification process executed in storage system 100P in the case of the two-stage notification format mentioned above is shown as well. FIGS. 26A-26B are illustrations showing a status notification command and a command response to the status notification command. FIG. 27 is an illustration showing an example of a graphic displayed on the display device 240 of the host computer 200.

When a fault notification is received (Step S501), the host computer 200 identifies the fault content (Step S504). Here, in order to identify the fault content, it is necessary to acquire specific fault information (the aforementioned fault location information and fault type information). Accordingly, in the case of the two-stage notification format mentioned above, prior to Step S504, it is necessary to carry out a process to acquire specific fault information (Steps S502 and S503). In the case of the direct notification format mentioned above, Steps S502 and S503 are not necessary.

First, the processes of Steps S502 and S503 in the of the two-stage notification format will be described, including the corresponding processes in the host adaptor 110P of the storage system 100P. In the two-stage notification format, the host computer 200 transmits to storage system 100P a status notification command, by way of a process for querying the storage system 100P as to specific fault information (Step S502). This is one of the storage system control processes using the command mentioned above. FIG. 26A shows an example of a status notification command. Since this command is a kind of local control, it is not a command chain but rather a command consisting of a control content instruction command C1 only. As shown in FIG. 26A, the content to instruct is status notification, and the target volume is the fault notification volume P0.

The host adaptor 110P of the storage system 100P that receives this command recognizes from the content of instruct (status notification) and the target volume (fault notification volume P0) that it is a query for specific fault information, and refers to the fault management table 145P to acquire specific fault information (Step S602). It then generates a command response recording the acquired specific fault information, and transmits the generated response to the host computer 200 (Step S604). An example of the command response R1 is shown in FIG. 26B. As shown in FIG. 26B, the content of the response is a status notification response, recording the fault location (e.g. volume, path) and the fault type (e.g. volume fault, timeout). While FIG. 26B shows only one fault recorded, several faults could be recorded.

The host computer 200 receives the command response R1 transmitted by the storage system 100P (host adaptor 110P) (Step S503). By so doing, the host computer 200 acquires specific fault information. In the case of the two-stage notification format, after the notification that fault has occurred has been made, the specific fault information may be acquired when the load on the CPU 210 of the host computer 200 is small, or when a request input is received from the user, so the timing for acquisition of the specific fault information is flexible.

The process beginning with Step S504 is a process common to both direct notification format and two-stage notification format. The host computer 200 records the acquired fault information in the fault management table 300 (Step S504). The host computer 200 refers to the acquired fault information, the storage system information 226, and the group information 228 to identify the fault content for display in the next step (Step S505). For example, where the fault information shown in FIG. 26B (volume fault of volume R3) has been acquired, the fault will be identified as "a fault in the secondary volume of a local mirror (group #3) of storage system 100R."

Next, the host computer 200 displays the identified fault on the display device 240 of the host computer 200 (Step S506). On the display device 240 there is displayed, for example, a graphic representing the volumes present in the storage systems 100P, 100L, 100R, together with their copy pair formation status. In FIG. 27, copy pair formation relationships are indicated by arrows. Display of a fault may be carried out, for example, as shown in FIG. 27, by flashing or changing the color of the graphic corresponding to the location of the identified fault (in the example in FIG. 27, volume R3 of storage system 100R). The graphic representing the fault may be designed so that when clicked by the user, the text indicating the details of the fault is displayed.

As an alternative embodiment for fault display, a graphic of the fault notification volume P0 may be displayed on the display device 240. Here, since as noted previously the fault notification volume P0 is a virtual volume, it is preferable for it to be displayed distinguished in some way from other volumes (real volumes). For example, it may be displayed with a different color from other volumes. When a fault occurs, the graphic of the fault notification volume P0 may flash or change color, and the fault notification volume P0 graphic may be designed so that when clicked by the user, the text indicating the details of the fault is displayed.

A-2-6. Fault Recovery Process

Figures 28, 29:
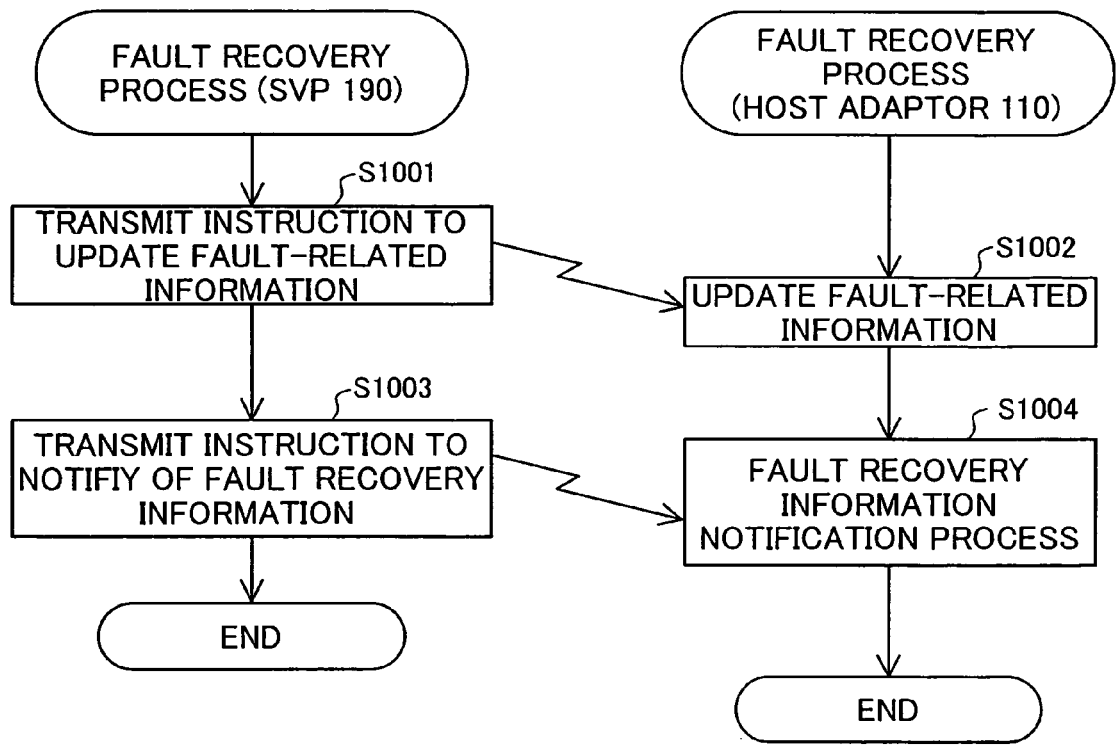
FIG. 28 is a flowchart showing the processing routine of the fault recovery post-process.
FIG. 29 is an illustration showing an example of fault recovery information.
Figure 30:
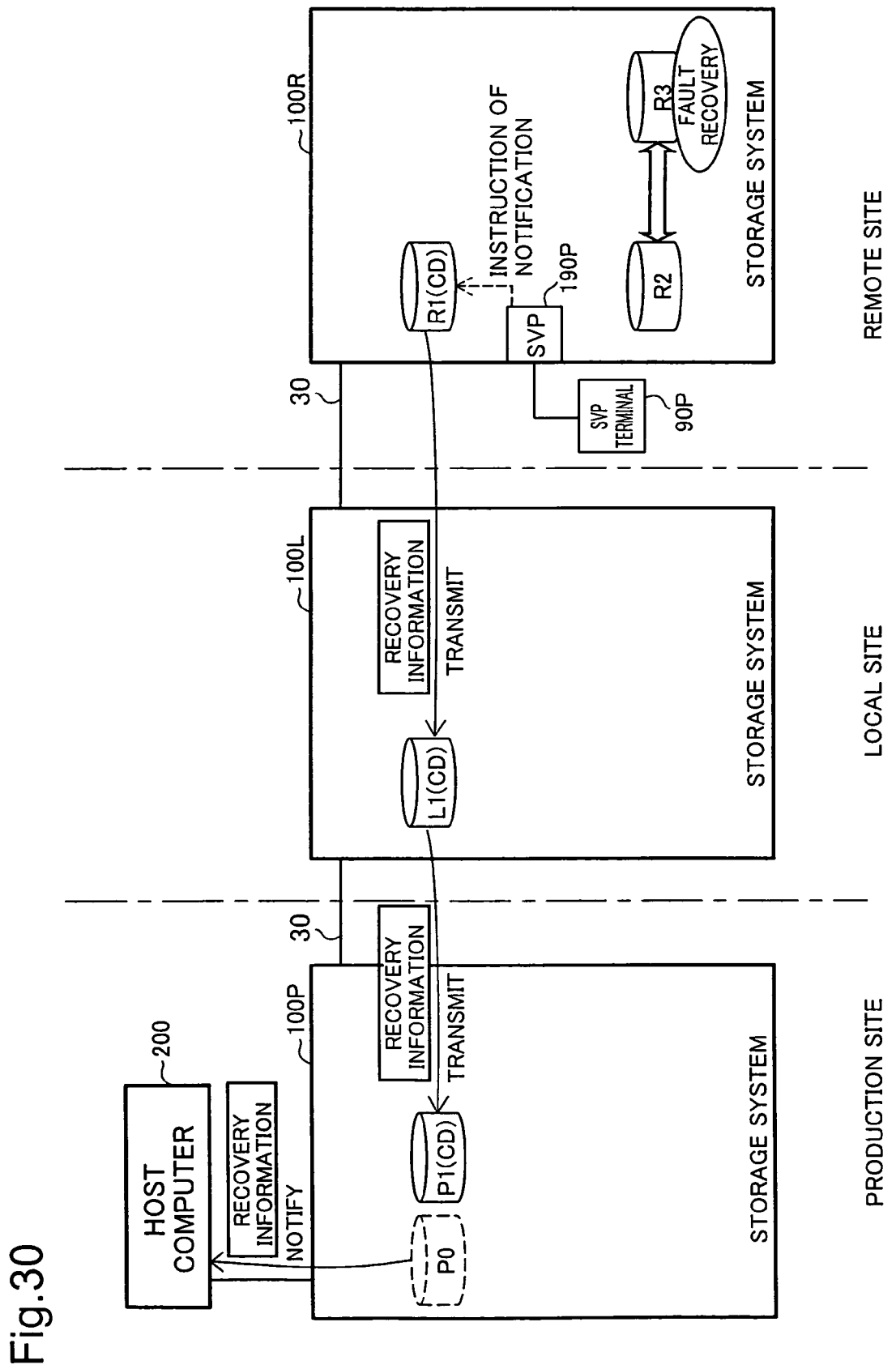
FIG. 30 is a conceptual depiction of notification of the host computer of fault recovery information in a storage system at a remote site.
Figure 31:
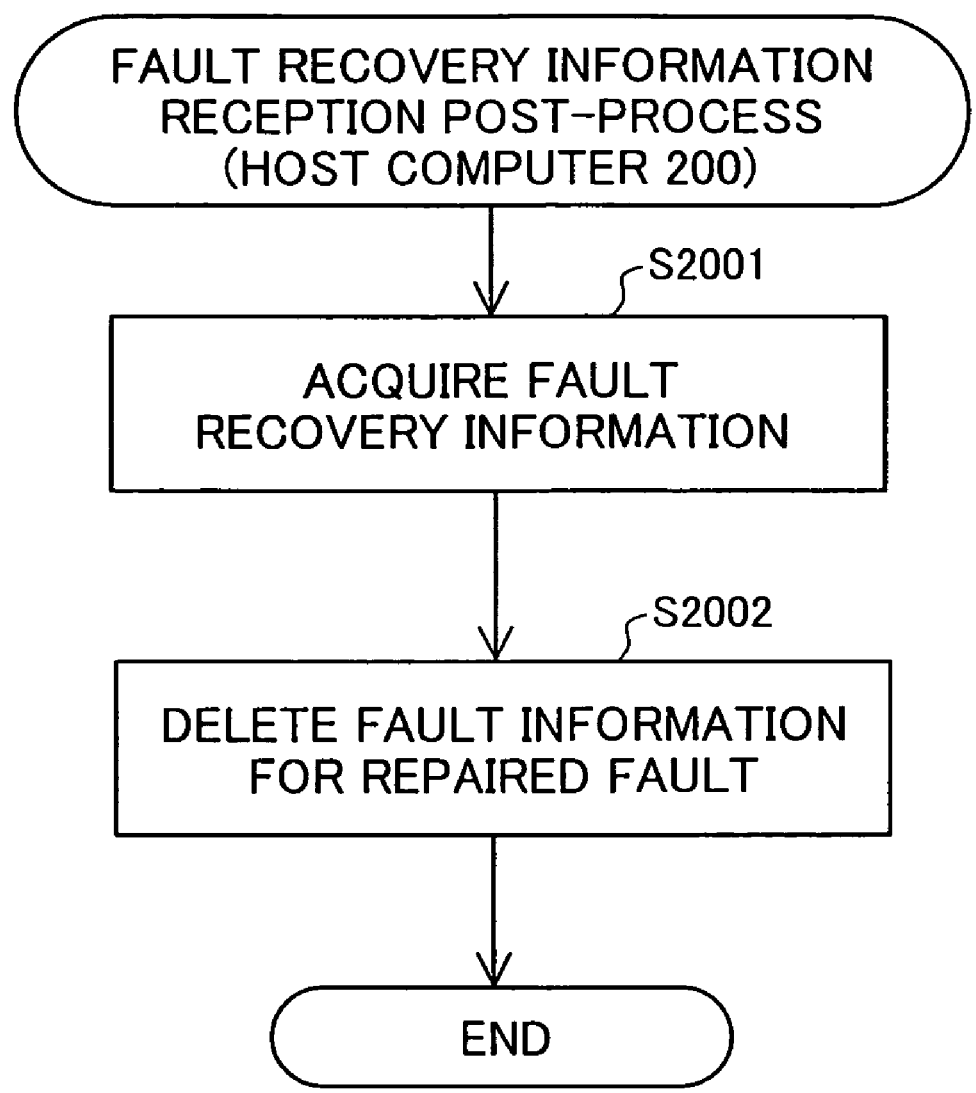
FIG. 31 is a flowchart showing the processing routine of the fault recovery information reception post-process.

The following description of the fault recovery process executed after the user has recognized a fault by means of display of the fault information described above makes reference to FIGS. 28-31. FIG. 28 is a flowchart showing the processing routine of the fault recovery post-process. FIG. 29 is an illustration showing an example of fault recovery information. FIG. 30 is a conceptual depiction of notification of the host computer 200 of fault recovery information in storage system 100R at a remote site. FIG. 31 is a flowchart showing the processing routine of the fault recovery information reception post-process;

First, upon becoming aware from the display device 240 etc. that a fault has occurred, the user takes measures to recover from the fault. For example, by operating via the SVP terminal 90 the SVP 190 of the storage system 100 in which the fault has occurred, it is possible to acquire more detailed fault information and verify the fault location. The user then takes measures necessary to recover from the fault. For example, in the event that the fault is a volume fault, the SVP 190 may be controlled to verify operation of the HDD 180 corresponding to the volume in which the fault occurred, and if the HDD is found to be malfunctioning, it may be replaced, or the volume assigned to another HDD 180 that is operating normally. Where the fault is a timeout on a path, the SVP 190 may be controlled to verify the status of the data line 30 (physical path) constituting the path, and if it is found that a break has occurred the data line 30 (physical path), it may be replaced, or the path assigned to another data line 30 (physical path) that is operating normally. In order to recognize whether timeout on a path is due to a break on the data line 30 (physical path) or to overload, for example, status verification of the data line 30 may be carried out several times, and if timeout persists over several tries, it may be concluded that a break has occurred the data line 30 (physical path).

After the user has taken the necessary recovery measures, the SVP 190 is controlled to update the fault-related information. Thereupon, the SVP 190 transmits a fault-related information update instruction to the host adaptor 110 of the storage system 100 for which recovery measures have been taken (Step S1001).

When the host adaptor 110 receives the fault-related information update instruction, it updates the fault-related information (Step S1002). Fault-related information targeted for update refers to, for example, the volume information 141P stored in the shared memory 140 (see FIG. 5A), the pair information 142P (see FIG. 5B), and the path information 143P (see FIG. 5C). Specifically, in the event that the HDD corresponding to the volume in which the fault occurred has been replaced, the "volume status" of this volume will be restored from "abnormal" to "normal."

After the fault-related information has been updated, the user controls the SVP 190 to instruct that the host computer 200 be notified of fault recovery information. Thereupon, the SVP 190 transmits a fault recovery information notification instruction to the host adaptor 110 of the storage system 100 for which recovery measures have been taken (Step S1003).

When the host adaptor 110 receives the fault recovery information notification instruction, it executes a fault recovery information notification process (Step S1004). The fault recovery information notification process is executed by means of a process similar to the process of fault information notification described previously (see FIGS. 21-23). The only difference is that the reported information is fault recovery information, not fault information. An example of reported fault recovery information is shown in FIG. 30. FIG. 30 shows fault recovery information indicating that volume R3 of storage system 110R which was in fault status has now recovered.

The following brief description of fault recovery information notification makes reference to FIG. 30. As a specific example, there will be described notification of fault recovery information in the case of recovery from a fault by volume R3 of storage system 100R. In the same manner as with notification of fault information when the aforementioned fault has occurred (see FIG. 24), the storage system 100R refers to the fault notification table 144R and identifies the destination for transmission of fault recovery information (in the embodiment, the command device L1 of storage system 100L is identified). Then, the host adaptor 110R transmits the fault recovery information to the identified destination. The host adaptor 110L of the storage system 100L which receives the fault recovery information transmitted by the storage system 100R, in the same manner as when receiving fault information, refers to the fault notification table 144L and identifies the destination for transmission of fault recovery information (in the embodiment, the command device P1 of storage system 100P is identified). Then, the host adaptor 110L transmits the fault recovery information to the identified destination.

The host adaptor 110P of the storage system 100P which receives the fault recovery information transmitted by the storage system 100L notifies the host computer 200 of the received fault recovery information. Notification of fault recovery information, like notification of fault information, is reported as recovery of a fault of the fault notification volume P0. Also, like notification of fault information, notification of fault recovery information may take place in direct notification format or two-stage notification format.

The following description of the process in the host computer 200 receiving fault recovery information makes reference to FIG. 31. When fault recovery information is received, the host computer 200 acquires the fault recovery information (Step S2001). In the case of direct notification format, the reported fault recovery information is acquired as-is. In the case of two-stage notification format, in the same manner as with fault information, a command to query for specific fault recovery information is transmitted to storage system 100P, and specific fault recovery information is acquired by way of a command response to this command. Once fault recovery information is acquired the host computer 200, referring to the fault recovery information, deletes the fault information for the repaired fault (Step S2002). That is, of the fault information recorded in the fault management table, the host computer 200 deletes that fault information which pertains to the fault reported to have been repaired by the fault recovery information.

By means of the above process, the host computer 200, together with the storage systems 100, are all restored to their status prior to occurrence of the fault.

According to the computer system which pertains to the embodiment described hereinabove, when a fault occurs in a storage system (e.g. storage system 100R) that is connected indirectly to the host computer 200 via another storage system 100, the fault information is transmitted over a communication route which is a connection route leading from a storage system 100 to the host computer 200 (for example, the path storage system 100R—storage system 100L—storage system 100P—host computer 200), ultimately notifying the host computer 200. As a result, even without a process whereby the host computer 200 sends an instruction or query to a storage system 100 which experiences a fault, the host computer 200 can nevertheless be notified of fault information from the storage system 100. Accordingly, the processing load on the host computer 200 needed to acquire fault information from the storage system 100 can be reduced.

Additionally, when the host computer 200 transmits a command whose content to instruct is a copy pair configuration command to storage systems 100, in the storage systems 100 which receive the control command over the communication route leading from the host computer 200 to the storage system 100 targeted for control, sender storage system information and pair defining information are recorded in association with one other in a fault notification table 144, which are used to perform transmission/notification of fault information in the manner described above, whereby no special processes are required of the host computer 200 in order to acquire fault information.

Additionally, even if fault occurs on another storage system, storage system 100P notifies the host computer 200 as if it were a fault of the fault notification volume P0 of its own local storage system, whereby even if the OS of the host computer 200 does not support notification of fault information of other storage systems, it can nevertheless be notified of fault information of other storage systems provided that notification of fault information of the storage system 100P able to communicate with the host computer 200 is supported. By adopting a direct notification format or two-stage notification format depending on the OS, compatibility with various OS may be afforded.

Additionally, since the fault notification volume Po is a virtual volume, there is no wasteful use of the memory area of storage system 100P.

B. Variations

B-1. Variation 1

Figure 32A:
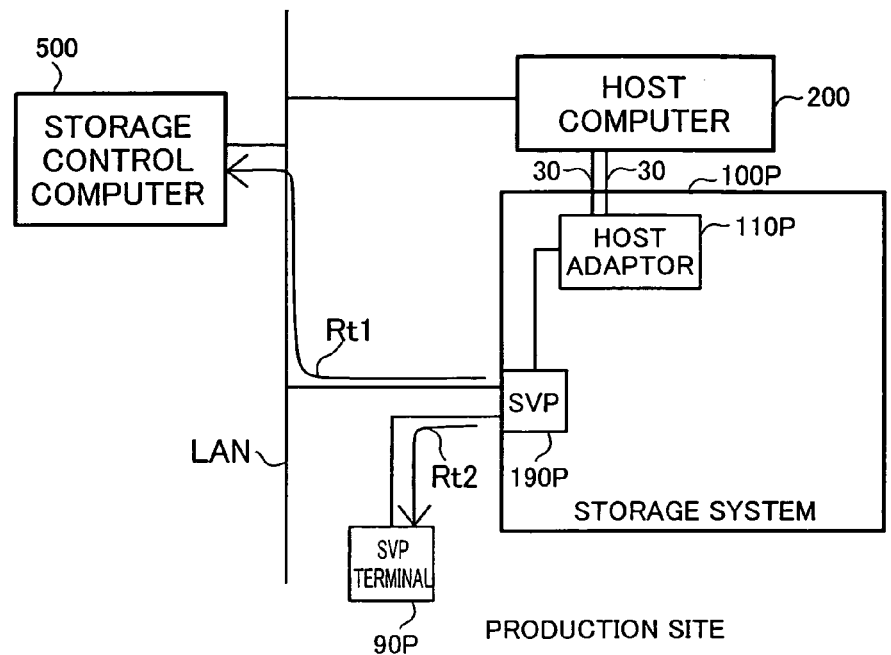
FIGS. 32A-32B are illustrations showing a simplified arrangement of the computer system pertaining to Variation 1.
Figure 32B:
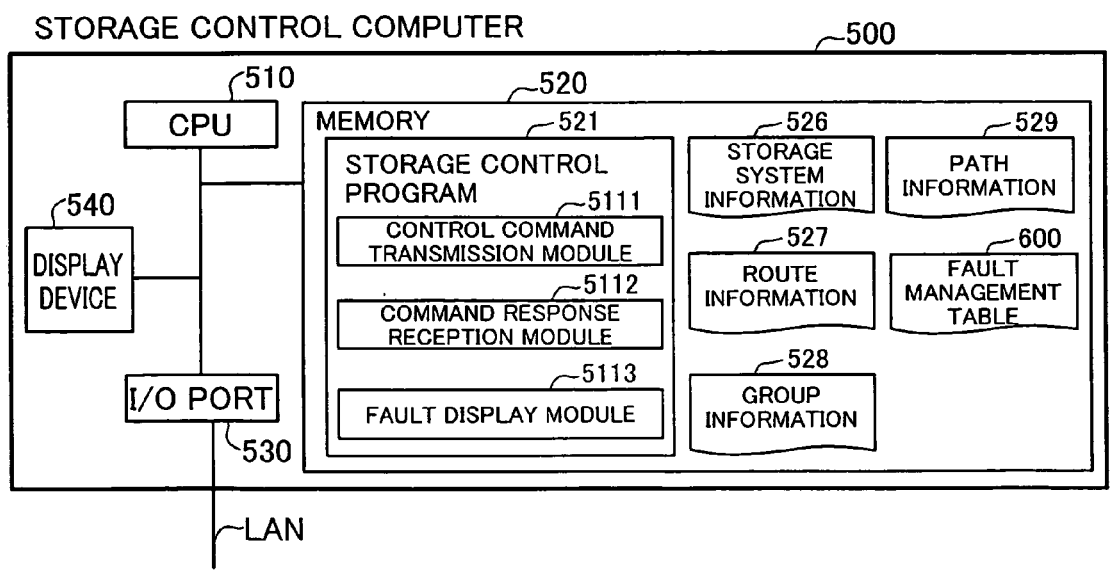

Whereas in the embodiment hereinabove, fault information is reported from the storage system 100P to the host computer 200, but could be reported to another device instead of the host computer 200, or in addition to the host computer 200. FIGS. 32A-32B are illustrations showing a simplified arrangement of the computer system pertaining to Variation 1. In FIG. 32A, only the hardware arrangement at the production site is shown, with the arrangement of the other sites being omitted from the drawing, the arrangement of the other sites is the same as in the embodiment above. In FIG. 32A, regarding the hardware arrangement of storage system 100P, while some elements have been omitted from the drawing (e.g. the shared memory 140, disk adaptor 150 etc.), the omitted elements are the same as in the embodiment above. As shown in FIG. 32A, the computer system pertaining to Variation 1 includes a storage control computer 500. The storage control computer 500 is connected to the SVP 190 of storage system 100P and to the host computer 200 via a local area network (LAN (e.g. Ethernet)).

As shown in FIG. 32B, the storage control computer 500, like the host computer 200, includes a CPU 510, memory 520, and a display device 540. The storage control computer 500 also includes an I/O port 530 for connection to the LAN. Memory 520 stores storage system information 526, route information 527, group information 528, path information 529, a fault management table 600, and a storage control program 521. These are the same as the information and program of the same name stored in memory 220 of the host computer 200 in the embodiment.

In the computer system pertaining to Variation 1, by means of execution of the storage control program 521, the storage control computer 500 is able to execute all of the processes for controlling the storage system 100 in the computer system, which in the embodiment were executed by the host computer 200. The all of the processes includes the storage system control process (see FIG. 11), fault notification volume creation process (see FIG. 15), fault information reception post-process (see FIG. 25), and fault information reception post-process (see FIG. 31). The storage control computer 500 transmits the various commands via the host computer 200, and receives the various command responses via the host computer 200.

By so doing, the host computer 200 no longer needs to execute control of the storage systems 100, so that the resources of the host computer 200 can be concentrated on data processing tasks.

In the computer system pertaining to Variation 1, fault information reported to the host computer 200 in the embodiment is instead reported to the storage control computer 500 via the SVP 190P of storage system 100P. Specifically, when executing notification of fault information, the host adaptor 110P of the storage system 100P that acquired the fault information notifies the SVP 190 instead of the host computer 200 of the acquired fault information. Or, the SVP 190 may periodically query the host adaptor 110P to acquire fault information received by the host adaptor 110P.

The SVP 190P may notify the storage control computer 500 of fault information via the LAN, using SNMP (Simple Network Management Protocol), CIM (Common Information Model), or other network management protocol (corresponds to communication path Rt1 shown in FIG. 32A). Using such protocols, the storage control computer 500 may be notified of fault information asynchronously (spontaneously).

The SVP 190P may also notify the SVP terminal 90P of fault information (corresponds to communication path Rt2 shown in FIG. 32A). By so doing, the user can obtain fault information from the SVP terminal 90P as well.

Failure recovery information (FIG. 29) as well, like the fault information discussed above, may be reported from the SVP 190P to the storage control computer 500 and the SVP terminal 90P.

Variation 2:

The computer system 1000 of the embodiment hereinabove is merely exemplary, various other arrangements being possible with regard to the placement and connection relationships of the storage systems 100 in the computer system 1000. For example, while the computer system 1000 of the embodiment is composed of a three sites, namely, a production site, a local site, and a remote site, it would be possible for the computer system to instead be composed of two sites, or of four or more sites. Geographic positional relationships among sites may be selected arbitrarily.

Whereas in the embodiment, one storage system 100 is situated at each site, it would be possible to configure the computer system 1000 with two or more storage systems 100 at each site.

Also, whereas in the embodiment two host adaptors 110 are provided for each storage system 100, with an external device (the host computer 200 or another storage system 100) connected to each host adaptor 110, it would be possible instead to equip each storage system 100 with three or more host adaptors 110, to allow connection to a larger number of host computers 200 and storage systems 100.

Figure 33:
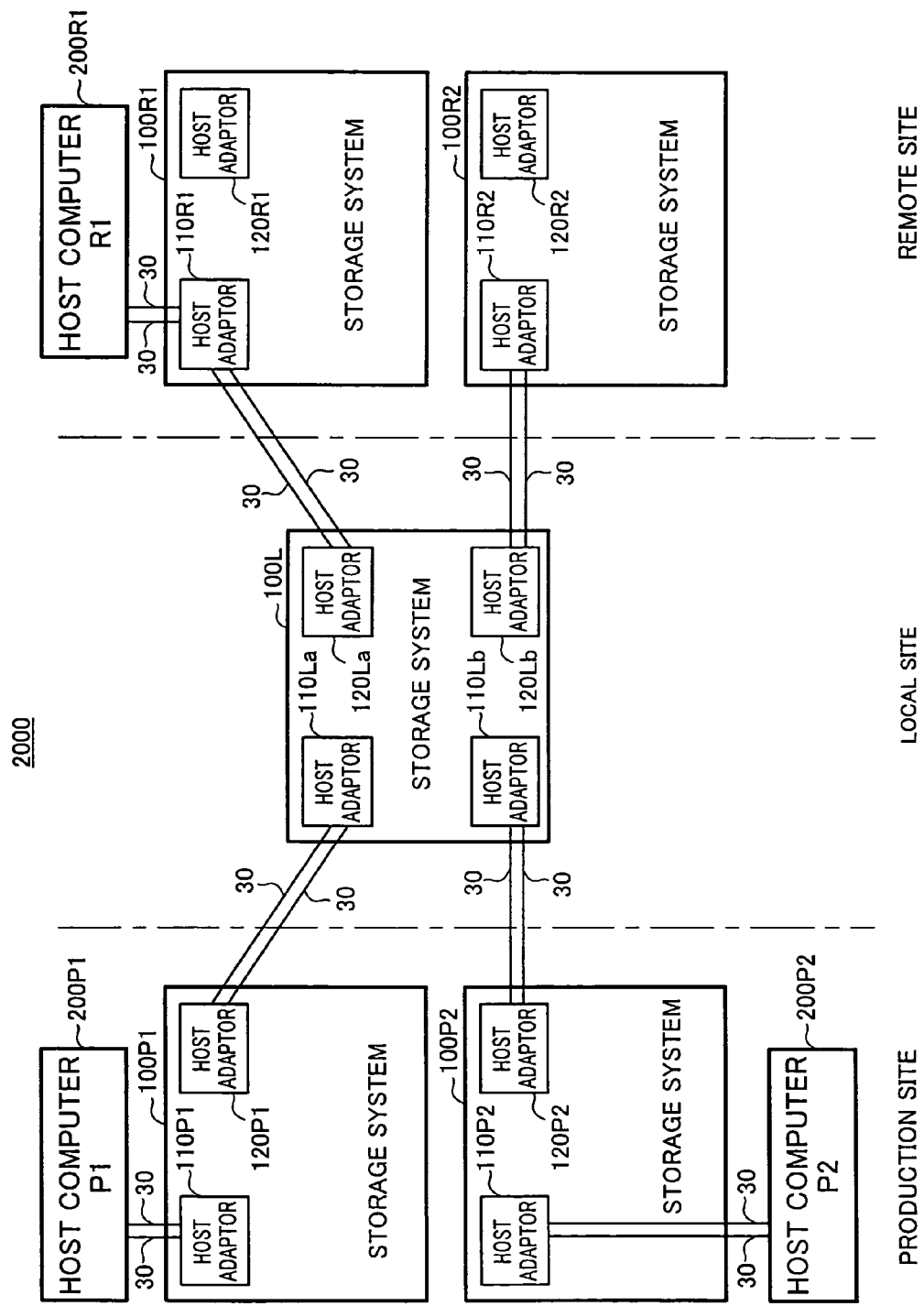
FIG. 33 is an illustration showing a simplified arrangement of the computer system pertaining to Variation 2.

FIG. 33 is an illustration showing a simplified arrangement of the computer system pertaining to Variation 2. In FIG. 33, only the host adaptors 110, 120 are shown as constituent elements of each storage system 100, and while the other elements have been omitted from the drawing they are the same as in the embodiment. The computer system 2000 pertaining to Variation 2 includes two storage systems 100P1, 100P2 situated at the production site, one storage system 100L situated at the local site, and two storage systems 100R1, 100R2 situated at the remote site. The computer system 2000 pertaining to Variation 2 also includes three host computers 200P1, 200P2, 200R1.

The storage systems 100P1, 100P2, 100R1, 100R2 located at the production site and the remote site are connected to the local site storage system 100L by means of data lines 30. Host computer 200P1 is connected to storage system 100P1, host computer 200P2 to storage system 200P2, and host computer 200R2 to storage system 100R2, respectively, by means of data lines 30.

The respective host computers 200 can control all of the storage systems 100 by means of sending the various commands described in the embodiment, to all storage systems 100 including those storage systems 100 not directly connected to them. FIGS. 34A-34C show route information 227P1, 227P2, 227R1 stored respectively in memory of the three host computers 200P1, 200P2, 200R. In the computer system 1000 pertaining to the embodiment, the three storage systems 100 are simply connected in series, so only one route is recorded in the route information 227, whereas in the computer system 2000 pertaining to Variation 2, the three routes needed to transmit commands from the host computers 200 to all of the storage systems 100 are recorded respectively in route information 227P1, 227P2, 277R1.

In the storage systems 100, by means of executing the fault notification-related process described previously (FIGS. 19-24), a fault occurring in any of the storage systems 100 can be correctly reported to the host computer 200 which manages the copy pair in which the fault occurred. For example, let it be assumed that the host computer 200P2 transmits a command having, as content to instruct, a copy pair configuration to the storage system 100R1, and a copy pair is configured in storage system 100R1. During this time, the command is transmitted to storage system 100R1 over route #1 recorded in the route information 227P2 shown in FIG. 34B (host computer 200—storage system 100P2—storage system 100L—storage system 100R1). Fault information of a fault (volume fault or path fault) relating to the copy pair configured by this command, by means of the fault notification-related process described previously (FIGS. 19-24), will be reported to the host computer 200P2 managing (configuring) the copy pair, by going back in the reverse direction through the command communication route (storage system 100R1—storage system 100L—storage system 100P2—host computer 200). In no instance with the host computer 200P1 or host computer 200R1 not managing the copy pair be erroneously notified of fault information, without being reported to the host computer 200P2 managing (configuring) the copy pair.

Other Variations

In the embodiment, creation and deletion of fault notification volumes (FIG. 15, FIGS. 16A-16D) is executed by means of the host computer 200 transmitting commands to the host adaptor 110P, but could instead be executed by having the SVP 190 of a storage system 100 transmit commands to create and delete fault notification volumes to the host adaptor 110P. This is because in preferred practice processes relating to faults can be executed by the user by means of controlling the SVP 190, which is the maintenance computer, via the SVP terminal 90.

In the fault notification route information management process (see FIG. 20) in the embodiment, in the event that the host adaptor 110 has received a copy pair termination command, the host adaptor 110 deletes the corresponding fault notification route information from the fault notification table 144 (FIG. 20: Step S204). Instead, when the host adaptor 110 receives copy pair termination commands, the host adaptor 110 may, by means of a FIFO (First In First Out) queue process of the corresponding fault notification route information, hold a predetermined number of items of information. For example, up to 10 items of fault notification route information deleted in the embodiment may be held, and in the event that a copy pair termination command in excess of 10 is received, the items of fault notification route information may be deleted in order beginning with that received first. In this case, it is possible to notify the host computer 200 of a fault occurring in copy process termination.

While the computer system, storage system, and computer system control method pertaining to the invention have been shown and described on the basis of the embodiment and variation, the embodiments of the invention described herein are merely intended to facilitate understanding of the invention, and implies no limitation thereof. Various modifications and improvements of the invention are possible without departing from the spirit and scope thereof as recited in the appended claims, and these will naturally be included as equivalents in the invention.

What is claimed is:

1. A computer system comprising:

a computer;

a first storage system configured to be communicable with the computer; and a second storage system configured to be communicable with the first storage system, wherein the second storage system identifies the first storage system that is capable of communicating with the second storage system, detects a first fault occurring in the second storage system; and transmits first fault information to the identified first storage system, the first fault information being related to the detected first fault, wherein the first storage system notifies the computer of the transmitted first fault information, wherein the notification is not performed in response to either an instruction or a query from the computer, wherein the computer receives the first fault information from the first storage system, and stores the first fault information, the computer system further comprising:

a third storage system configured to be communicable with the second storage system, wherein the third storage system identifies the second storage system that is capable of communicating with the third storage system, detects a second fault occurring in the third storage system, and transmits second fault information to the identified second storage system, the second fault information being related to the detected second fault, wherein the second storage system further receives the second fault information from the third storage system, and transmits the received second fault information to the first storage system, wherein the first storage system further receives the second fault information from the second storage system, and transmits the received second fault information to the computer, wherein the transmission of the second fault information to the computer is not performed in response to either an instruction or a query from the computer, wherein the computer receives the second fault information from the first storage system, and stores the second fault information, wherein the first, second and third storage systems include a plurality of storage areas, wherein two storage areas among the plurality of storage areas are configurable as a copy pair, wherein the copy pair is a combination of two storage areas between which copy operations from one to the other are carried out, wherein the third storage system is arranged to receive a control command via the first and second storage systems, wherein the control command is a copy pair configuration command that includes pair defining information to define the copy pair, wherein the copy pair configuration command instructs the third storage system to configure the copy pair defined by the pair defining information, wherein the second storage system and the third storage system record the pair defining information in association with information recorded in the second and third storage systems identifying the transmitting storage system, and wherein the identification of the first storage system by the second storage system and the identification of the second storage system by the third storage system are executed using recorded pair defining information;

wherein the third storage system further identifies the second storage system for transmission of fault recovery information for recovering from the second fault, and transmits the fault recovery information to the second storage system, wherein the second storage system further receives the fault recovery information transmitted by the third storage system, identifies the first storage system for transmission of the fault recovery information, and transmits the fault recovery information to the first storage system, wherein the first storage system further receives the fault recovery information transmitted by the second storage system, and notifies the computer of the received fault recovery information, and wherein the computer further receives the fault recovery information transmitted by the first storage system, and deletes the stored second fault information.

2. A computer system according to claim 1, wherein the computer transmits the control command to the third storage system via the first storage system and the second storage system, wherein the second storage system and the third storage system comprise a memory, and, when receiving the control command, record information to identify a transmitting storage system in the memory, wherein the transmitting storage system has transmitted the control command, and wherein the identified first storage system and the identified second storage system is the transmitting storage system that the information to identify is recorded.

3. A computer system according to claim 1, wherein the first storage system notifies the computer of the transmitted fault information as a fault of a storage area in the first storage system.

4. A computer system according to claim 1, wherein the first storage system provides a virtual storage area to the computer, and notifies the computer of specifics of the fault in response to access to the virtual storage area by the computer, wherein the specifics of the fault is based on the transmitted fault information.

5. A computer system according to claim 1, wherein the first storage system notifies the computer of occurrence of the detected fault as the fault information, and when a query regarding specifics of the detected fault is received from the computer that has received the notification, the first storage system notifies the computer of the specifics of the detected fault.

6. A computer system according to claim 1, wherein the storage systems include a storage area, the fault information is information about a fault in the storage area or in a data line, the data line connecting each storage system for data transmission.

7. A computer system according to claim 1, wherein the computer is a host computer to transmit and receive data, the host computer being connected to the first storage system by means of a data line for transmitting and receiving the data, and the notification of the fault information takes place via the data line.

8. A computer system according to claim 1 further comprising a host computer as another computer to transmit and receive data, the host computer being connected to the first storage system by means of a data line for transmitting and receiving the data.

9. A computer system according to claim 8, wherein the computer to be notified the fault information is connected to the first storage system by means of a communication line different from the data line, and wherein notification of the fault information takes place via the communication line.

10. A computer system according to claim 1, wherein when the second storage system acquires fault recovery information indicating recovery from the fault relating to the notified fault information, the second storage system further transmits the acquired fault recovery information to the identified first storage system, and wherein the first storage system further notifies the computer of the transmitted fault recovery information.

11. A storage system comprising:

a first interface configured to communicate with an external device;
a second interface configured to communicate with a first external storage system;
a controller connected to the first interface and to the second interface; and
a plurality of storage devices connected to the controller,
wherein the controller receives fault information relating to a fault in the first external storage system,
the controller detects a fault occurring in the storage system,
in case that the external device is a computer, when the controller receives a control command from the computer via the first interface, the controller makes first for-fault notification information which indicates that a destination of the fault information is the computer, and stores the first for-fault notification information in a memory of the storage system; and the controller notifies the computer via the first interface of the received fault information or of fault information relating to the detected fault in accordance with the first for-fault notification information, wherein the notification is not performed in response to either an instruction or a query from the computer, and
wherein upon receipt of the notification from the controller, the computer stores the received fault information or fault information relating to the detected fault in accordance with the first for-fault notification information,
in case that the external device is a second external storage system situated on a communication route leading to a computer, when the controller receives a control command from the computer via the first interface, the controller makes second for-fault notification information which indicates that a destination of fault information is the second external storage system, and stores the second for-fault notification information in a memory of the storage system; and the controller notifies the second external storage system via the first interface of the received fault information or of fault information relating to the detected fault in accordance with the second for-fault notification information;
wherein the first external storage system further
identifies the storage system for transmission of fault recovery information, and
transmits the fault recovery information to the storage system,
wherein the storage system further
receives the fault recovery information transmitted by the first external storage system,
identifies the second external storage system for transmission of the fault recovery information, and
transmits the fault recovery information to the second external storage system,
wherein the second external storage system further
receives the fault recovery information transmitted by the second storage system, and
notifies the computer of the received fault recovery information, and
wherein the computer
receives the fault recovery information transmitted by the second external storage system, and
deletes the stored fault information.

12. A method of managing fault in a computer system, wherein the computer system comprises a computer, a first storage system configured to be communicable with the computer, a second storage system configured to be communicable with the first storage system, and a third storage system configured to be communicable with the second storage system, the method comprising:

in the second storage system:
identifying the first storage system that is capable of communicating with the second storage system;
detecting a first fault occurring in the second storage system; and
transmitting first fault information to the identified first storage system, the first fault information being related to the detected first fault,
in the first storage system:
notifying the computer of the transmitted first fault information, wherein the notification is not performed in response to either an instruction or a query from the computer,
in the computer:
receiving the first fault information from the first storage system: and
storing the first fault information,
in the third storage system:
identifying the second storage system that is capable of communicating with the third storage system,
detecting a second fault occurring in the third storage system, and
transmitting second fault information to the identified second storage system, the fault information being related to the detected second fault,
further in the second storage system:
receiving the second fault information from the third storage system, and
transmitting the received second fault information to the first storage system,
further in the first storage system:
receiving the second fault information from the second storage system, and
transmitting the received second fault information to the computer, wherein the transmission is not performed in response to either an instruction or a query from the computer,
further in the computer
receiving the second fault information from the first storage system, and
storing the second fault information,
wherein the first, second, and third storage systems include a plurality of storage areas, wherein two storage areas among the plurality of storage areas are configurable as a copy pair, wherein the copy pair is a combination of two storage areas between which copy operations from one to the other are carried out,
wherein the third storage system is arranged to receive a control command via the first and second storage systems,
wherein the control command is a copy pair configuration command that includes pair defining information to define the copy pair, wherein the copy pair configuration command instructs the third storage system to configure the copy pair defined by the pair defining information,
wherein the second storage system and the third storage system record the pair defining information in association with information recorded in the second and third storage systems identifying the transmitting storage system, and
wherein the identification of the first storage system by the second storage system and the identification of the second storage system by the third storage system are executed using recorded pair defining information;

further in the third storage system:
  identifying the second storage system for transmission of fault recovery information for recovering from the second fault, and
  transmitting the fault recovery information to the second storage system,
further in the second storage system:
  receiving the fault recovery information transmitted by the third storage system,
  identifying the first storage system for transmission of the fault recovery information, and
  transmitting the fault recovery information to the first storage system,
further in the first storage system:
  receiving the fault recovery information transmitted by the second storage system, and
  notifying the computer of the received fault recovery information, and
further in the computer:
  receiving the fault recovery information from the first storage system, and
  deleting the stored second fault information.

13. A display method of displaying fault in a computer system, wherein the computer system comprises a computer equipped with a display device, a first storage system configured to be communicable with the computer, a second storage system configured to be communicable with the first storage system, and a third storage system configured to be communicable with the second storage system, the display method comprising:
  in the second storage system:
    identifying the first storage system that is capable of communicating with the second storage system;
    detecting a first fault occurring in the second storage system; and
    transmitting first fault information to the identified first storage system, the first fault information being related to the detected first fault,
  in the third storage system:
    identifying the second storage system that is capable of communicating with the third storage system,
    detecting a second fault occurring in the third storage system, and
    transmitting second fault information to the identified second storage system, the second fault information being related to the detected second fault,
  further in the second storage system:
    receiving the second fault information from the third storage system, and
    transmitting the received second fault information to the first storage system,
  wherein the first, second, and third storage systems include a plurality of storage areas, wherein two storage areas among the plurality of storage areas are configurable as a copy pair, wherein the copy pair is a combination of two storage areas between which copy operations from one to the other are carried out,
  wherein the third storage system is arranged to receive a control command via the first and second storage systems,
  wherein the control command is a copy pair configuration command that includes pair defining information to define the copy pair, wherein the copy pair configuration command instructs the third storage system to configure the copy pair defined by the pair defining information,
  wherein the second storage system and the third storage system record the pair defining information in association with information recorded in the second and third storage systems, and
  wherein the identification of the first storage system by the second storage system and the identification of the second storage system by the third storage system are executed using recorded pair defining information,
  in the first storage system:
    notifying the computer of the transmitted first or second fault information, wherein the notification is not performed in response to either an instruction or a query from the computer, and
  in the computer
    identifying the first or second fault that has occurred using the notified first or second fault information, respectively; and
    displaying the identified first or second fault on the display device.

* * * * *